US008463677B2

(12) United States Patent
Vonog et al.

(10) Patent No.: US 8,463,677 B2
(45) Date of Patent: Jun. 11, 2013

(54) SYSTEM ARCHITECTURE AND METHODS FOR EXPERIMENTAL COMPUTING

(75) Inventors: Stanislav Vonog, San Francisco, CA (US); Nikolay Surin, San Francisco, CA (US); Tara Lemmey, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 0 days.

(21) Appl. No.: 13/136,869

(22) Filed: Aug. 12, 2011

(65) Prior Publication Data
US 2012/0041859 A1 Feb. 16, 2012

Related U.S. Application Data
(60) Provisional application No. 61/373,193, filed on Aug. 12, 2010.

(51) Int. Cl.
*G06Q 40/00* (2012.01)
*G06Q 40/02* (2006.01)

(52) U.S. Cl.
CPC ...................................... *G06Q 40/02* (2013.01)
USPC ............. 705/35; 709/231; 709/232; 709/224; 370/352; 370/329; 715/753; 725/109; 725/93; 348/836

(58) Field of Classification Search
USPC ... 709/231, 232, 224; 370/352, 329; 715/753; 725/109; 713/153; 348/836
See application file for complete search history.

(56) References Cited

U.S. PATENT DOCUMENTS

| 6,144,991 | A   | 11/2000 | England |
| 7,171,485 | B2* | 1/2007  | Roach et al. .................. 709/232 |
| 7,516,255 | B1  | 4/2009  | Hobbs |
| 7,529,259 | B2* | 5/2009  | Van Acker et al. ........... 370/412 |
| 7,760,640 | B2* | 7/2010  | Brown et al. ................ 370/235 |
| 8,171,154 | B2  | 5/2012  | Vonog et al. |

(Continued)

FOREIGN PATENT DOCUMENTS
JP WO-02-41121 A2 5/2002
JP 2010-016662 A 1/2010

(Continued)

OTHER PUBLICATIONS
Band of the hand: handheld media platforms from Palm OS to Pocket PC pose new challenges to video producers, but they also present new opportunities; Ettin, Scott A.; EMedia, The Digital Studio Magazine, 16, 1, 44(12); Jan. 2003.*

(Continued)

*Primary Examiner* — Tien Nguyen
(74) *Attorney, Agent, or Firm* — Perkins Coie LLP

(57) ABSTRACT

The present invention contemplates a variety of improved methods and systems for providing an experience platform, as well as sentio or experience codecs, and experience agents for supporting the experience platform. The experience platform may be provided by a service provider to enable an experience provider to compose and direct a participant experience. The service provider monetizes the experience by charging the experience provider and/or the participants for services. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

17 Claims, 25 Drawing Sheets

U.S. PATENT DOCUMENTS

| | | |
|---|---|---|
| 8,234,398 B2 | 7/2012 | Vonog et al. |
| 8,255,552 B2 | 8/2012 | Witt et al. |
| 2003/0074554 A1* | 4/2003 | Roach et al. .................. 713/153 |
| 2003/0217170 A1 | 11/2003 | Nelson et al. |
| 2004/0128350 A1 | 7/2004 | Topfl et al. |
| 2007/0217436 A1* | 9/2007 | Markley et al. ............... 370/401 |
| 2007/0271580 A1 | 11/2007 | Tischer et al. |
| 2008/0004888 A1 | 1/2008 | Davis et al. |
| 2008/0039205 A1* | 2/2008 | Ackley et al. .................. 463/40 |
| 2008/0139301 A1 | 6/2008 | Holthe |
| 2008/0158373 A1 | 7/2008 | Chu |
| 2008/0205426 A1* | 8/2008 | Grover et al. ................. 370/429 |
| 2009/0013263 A1 | 1/2009 | Fortnow et al. |
| 2009/0046139 A1 | 2/2009 | Cutler et al. |
| 2009/0100452 A1 | 4/2009 | Hudgeons et al. |
| 2009/0183205 A1 | 7/2009 | McCartie et al. |
| 2009/0186700 A1 | 7/2009 | Konkle |
| 2009/0239587 A1 | 9/2009 | Negron et al. |
| 2010/0149096 A1 | 6/2010 | Migos et al. |
| 2010/0156812 A1 | 6/2010 | Stallings et al. |
| 2010/0185514 A1 | 7/2010 | Glazer et al. |
| 2010/0278508 A1 | 11/2010 | Aggarwal |
| 2011/0103374 A1 | 5/2011 | Lajoie et al. |
| 2011/0246908 A1 | 10/2011 | Akram et al. |
| 2012/0038550 A1 | 2/2012 | Lemmey et al. |
| 2012/0039382 A1 | 2/2012 | Vonog et al. |
| 2012/0060101 A1 | 3/2012 | Vonog et al. |
| 2012/0082226 A1 | 4/2012 | Weber |
| 2012/0191586 A1 | 7/2012 | Vonog et al. |

FOREIGN PATENT DOCUMENTS

| | | |
|---|---|---|
| KR | 10-2002-0038738 A | 5/2002 |
| KR | 10-2006-0062381 A | 6/2006 |
| KR | 2006-0083034 A | 7/2006 |
| KR | 10-2008-0008340 A | 1/2008 |
| KR | 10-2009-0113158 A | 10/2009 |
| KR | 10-2010-0098668 A | 9/2010 |
| WO | WO-2008/072923 A1 | 6/2008 |

OTHER PUBLICATIONS

RADVISION to Bring Scalable Video Coding (SVC) Technology to SCOPIA Conferencing Platform; Business Wire , p. NA; Apr. 21, 2009.*

Moving toward a dual-infrastructure facility; Moote, Stan; Suite, Steve; Roth, Todd; Kanaan, Nabil; Broadcast Engineering v46n9 pp. 72-78; Sep. 2004.*

Co-Pending U.S. Appl. No. 13/210,370 of Lemmey, T., et al., filed Aug. 15, 2011.
International Search Report PCT/US2011/047814 dated Apr. 9, 2012, pp. 1-3.
International Search Report PCT/US2011/047815 dated Apr. 9, 2012, pp. 1-3.
Written Opinion PCT/US2011/047814 dated Apr. 9, 2012, pp. 1-5.
Written Opinion PCT/US2011/047815 dated Aril 9, 2012, pp. 1-4.
International Search Report PCT/US2011/001424 dated Apr. 6, 2012, pp. 1-3.
International Search Report PCT/US2011/001425 dated Apr. 6, 2012, pp. 1-3.
Written Opinion PCT/US2011/001424 dated Apr. 6, 2012, pp. 1-3.
Written Opinion PCT/US2011/001425 dated Apr. 6, 2012, pp. 1-3.
Co-Pending U.S. Appl. No. 13/367,146 of Vonog, S., et al., filed Feb. 6, 2012.
Co-Pending U.S. Appl. No. 13/136,870 of Vonog, S., et al., filed Aug. 12, 2011.
Co-Pending U.S. Appl. No. 13/363,187 of Vonog, S., et al., filed Jan. 31, 2012.
Co-Pending U.S. Appl. No. 13/221,801 of Vonog, S., et al., filed Aug. 30, 2011.
International Search Report mailed May 16, 2012 of PCT Application No. PCT/US2011/057385, 9 pages.
Written Opinion mailed May 16, 2012 of PCT Application No. PCT/US2011/057385, 4 pages.
Co-Pending U.S. Appl. No. 13/279,096 of Vonog, S., et al., filed Oct. 21, 2011.
Co-Pending U.S. Appl. No. 13/461,680 of Vonog, S., et al., filed May 1, 2012.
Co-Pending U.S. Appl. No. 13/546,906 of Vonog, S., et al., filed Jul. 11, 2012.
Co-Pending U.S. Appl. No. 13/762,149 of Vonog, S., filed Feb. 7, 2013.
Co-Pending U.S. Appl. No. 13/694,582 of Vonog, S., filed Dec. 12, 2012.
Co-Pending U.S. Appl. No. 13/694,581 of Vonog, S., filed Dec. 12, 2012.
Non-Final Office Action mailed Mar. 19, 2013, in Co-Pending U.S. Appl. No. 13/367,146, filed Feb. 6, 2012.
Non-Final Office Action mailed Apr. 1, 2013, in Co-Pending U.S. Appl. No. 13/221,801, filed Aug. 30, 2011.
Notice of Allowance mailed Feb. 4, 2013, in Co-Pending U.S. Appl. No. 13/279,096, filed Oct. 21, 2011.

* cited by examiner

Adaptive Stream Routing
I/O Remixing
Device Discovery
Device Presence
Device Capability Profiling
Input & Output Capture & Encode
Decoding & Displays
Codecs
QoE and Quality Adaptation
  └ Network
  └ Device Resources
Security Component
Layer Recombination Engine
Hybrid Network Transfer Stack
Low Latency Network Protocol Experience Agent Components

FIG. 8

Tasks

| Name | Activator | Command | State | Slave | ID | Age | Active |
|---|---|---|---|---|---|---|---|
| Merger | xdLAQodf | Python Code | Running | powerslave | 308 | 00:00:10 | 00:00:10 |
| Encoder #0 | - | - | Finished | - | - | 00:00:09 | 00:00:08 |
| Encoder #1 | xdLAQodf | Python Code | Running | i-ble946da | 205 | 00:00:09 | 00:00:09 |
| Encoder #2 | xdLAQodf | Python Code | Running | i-b7e946dc | 204 | 00:00:09 | 00:00:09 |
| Encoder #3 | xdLAQodf | Python Code | Running | i-b7e946dc | 205 | 00:00:09 | 00:00:09 |
| Encoder #4 | xdLAQodf | Python Code | Running | i-b7e946dc | 206 | 00:00:09 | 00:00:09 |
| Encoder #5 | xdLAQodf | Python Code | Running | i-b7e946dc | 207 | 00:00:09 | 00:00:09 |
| Encoder #6 | - | Python Code | Finished | - | - | 00:00:09 | 00:00:09 |
| Encoder #7 | xdLAQodf | Python Code | Running | i-ble946da | 206 | 00:00:09 | 00:00:09 |
| Encoder #8 | xdLAQodf | Python Code | Running | i-ble946da | 207 | 00:00:09 | 00:00:09 |
| Encoder #9 | xdLAQodf | Python Code | Running | powerslave | 310 | 00:00:09 | 00:00:09 |
| Encoder #10 | xdLAQodf | Python Code | Running | powerslave | 311 | 00:00:09 | 00:00:09 |
| Encoder #11 | - | Python Code | Finished | - | - | 00:00:09 | 00:00:04 |

Activators

| Name | Connected |
|---|---|
| xdLAQodf | Yes |

Slaves

| Name | Ready | Load | Capacity |
|---|---|---|---|
| i-ble946da | Yes | 3 | 4 |
| powerslave | Yes | 3 | 5 |
| i-b7e946dc | No | 4 | 4 |

*FIG. 24*

SYSTEM ARCHITECTURE AND METHODS FOR EXPERIMENTAL COMPUTING

CLAIM OF PRIORITY

The present application claims priority to U.S. Provisional Application No. 61/373,193, entitled "SYSTEM ARCHITECTURE AND METHODS FOR COMPOSING AND DIRECTING PARTICIPANT EXPERIENCES," filed on Aug. 12, 2010, which is incorporated in its entirety herein by this reference.

BACKGROUND OF INVENTION

Field of Invention

The present teaching relates to experience platforms enabling flexible run-time allocation of computational resources, data streams routing, input/output virtualization and device interaction creating unique user experience.

SUMMARY OF THE INVENTION

The present invention contemplates a variety of improved methods and systems for providing a general purpose tool to enable a wide variety of applications referred to experiential computing.

Some of the attributes of "experiential computing" are: 1) pervasive—it assumes multi-screen, multi-device, multi-sensor computing environments both personal and public; this is in contrast to "personal computing" paradigm where computing is defined as one person interacting with one device (such as a laptop or phone) at any given time; 2) the applications focus on invoking feelings and emotions as opposed to consuming and finding information or data processing; 3) multiple dimensions of input and sensor data—such as physicality; 4) people connected together—live, synchronously: multi-person social real-time interaction allowing multiple people interact with each other live using voice, video, gestures and other types of input.

The experience platform may be provided by a service provider to enable an experience provider to compose and direct a participant experience. The service provider monetizes the experience by charging the experience provider and/or the participants for services. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

FIG. 8 illustrates the structure of an experience agent

FIG. 23-25 illustrate an exemplary multi-device video transcoding service utilized by the transcoding application, and incorporating a third-party service;

DETAILED DESCRIPTION OF THE INVENTION

Figure 1:
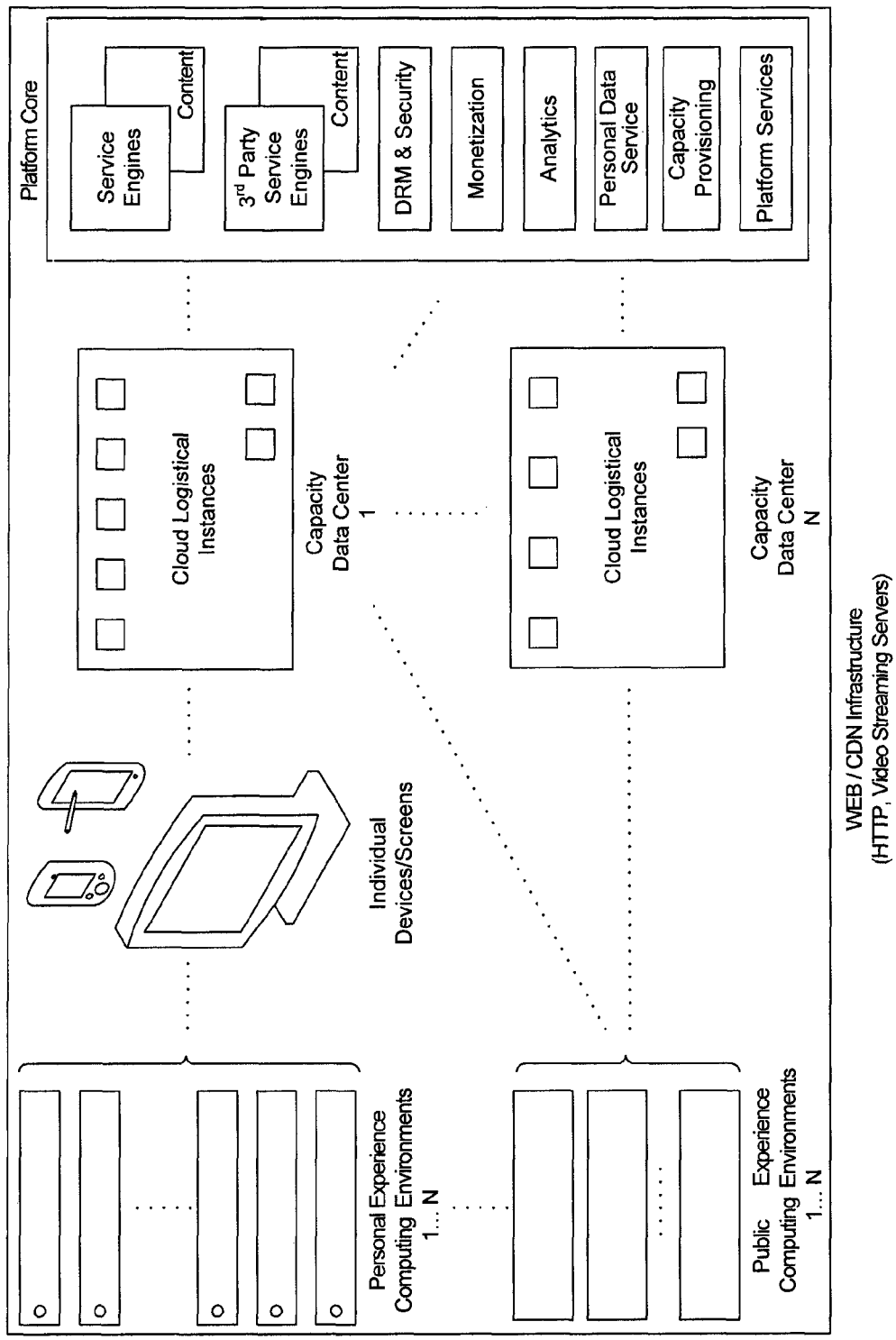
FIG. 1 illustrates a general system architecture for the experience platform

FIG. 1 illustrates a general system architecture for the experience platform. The system 10 can be viewed as an "experience platform" or system architecture for composing and directing a participant experience. In one embodiment, the experience platform 10 is provided by a service provider to enable an experience provider to compose and direct a participant experience. The participant experience can involve one or more experience participants. The experience provider can create an experience with a variety of dimensions, as will be explained further now. As will be appreciated, the following description provides one paradigm for understanding the multi-dimensional experience available to the participants. There are many suitable ways of describing, characterizing and implementing the experience platform contemplated herein.

In general, services are defined at an API layer of the experience platform. The services are categorized into "dimensions." The dimension(s) can be recombined into "layers." The layers form to make features in the experience.

By way of example, the following are some of the dimensions that can be supported on the experience platform.

Video—is the near or substantially real-time streaming of the video portion of a video or film with near real-time display and interaction.

Audio—is the near or substantially real-time streaming of the audio portion of a video, film, karaoke track, song, with near real-time sound and interaction.

Live—is the live display and/or access to a live video, film, or audio stream in near real-time that can be controlled by another experience dimension. A live display is not limited to single data stream.

Encore—is the replaying of a live video, film or audio content. This replaying can be the raw version as it was originally experienced, or some type of augmented version that has been edited, remixed, etc.

Graphics—is a display that contains graphic elements such as text, illustration, photos, freehand geometry and the attributes (size, color, location) associated with these elements. Graphics can be created and controlled using the experience input/output command dimension(s) (see below).

Input/Output Command(s)—are the ability to control the video, audio, picture, display, sound or interactions with human or device-based controls. Some examples of input/output commands include physical gestures or movements, voice/sound recognition, and keyboard or smart-phone device input(s).

Interaction—is how devices and participants interchange and respond with each other and with the content (user experience, video, graphics, audio, images, etc.) displayed in an experience. Interaction can include the defined behavior of an artifact or system and the responses provided to the user and/or player.

Game Mechanics—are rule-based system(s) that facilitate and encourage players to explore the properties of an experience space and other participants through the use of feedback mechanisms. Some services on the experience Platform that could support the game mechanics dimensions include leader boards, polling, like/dislike, featured players, star-ratings, bidding, rewarding, role-playing, problem-solving, etc.

Ensemble—is the interaction of several separate but often related parts of video, song, picture, story line, players, etc. that when woven together create a more engaging and immersive experience than if experienced in isolation.

Auto Tune—is the near real-time correction of pitch in vocal and/or instrumental performances. Auto Tune is used to disguise off-key inaccuracies and mistakes, and allows singer/players to hear back perfectly tuned vocal tracks without the need of singing in tune.

Auto Filter—is the near real-time augmentation of vocal and/or instrumental performances. Types of augmentation could include speeding up or slowing down the playback, increasing/decreasing the volume or pitch, or applying a celebrity-style filter to an audio track (like a Lady Gaga or Heavy-Metal filter).

Remix—is the near real-time creation of an alternative version of a song, track, video, image, etc. made from an original version or multiple original versions of songs, tracks, videos, images, etc.

Viewing 360°/Panning—is the near real-time viewing of the 360° horizontal movement of a streaming video feed on a fixed axis. Also the ability to for the player(s) to control and/or display alternative video or camera feeds from any point designated on this fixed axis.

Figure 2:
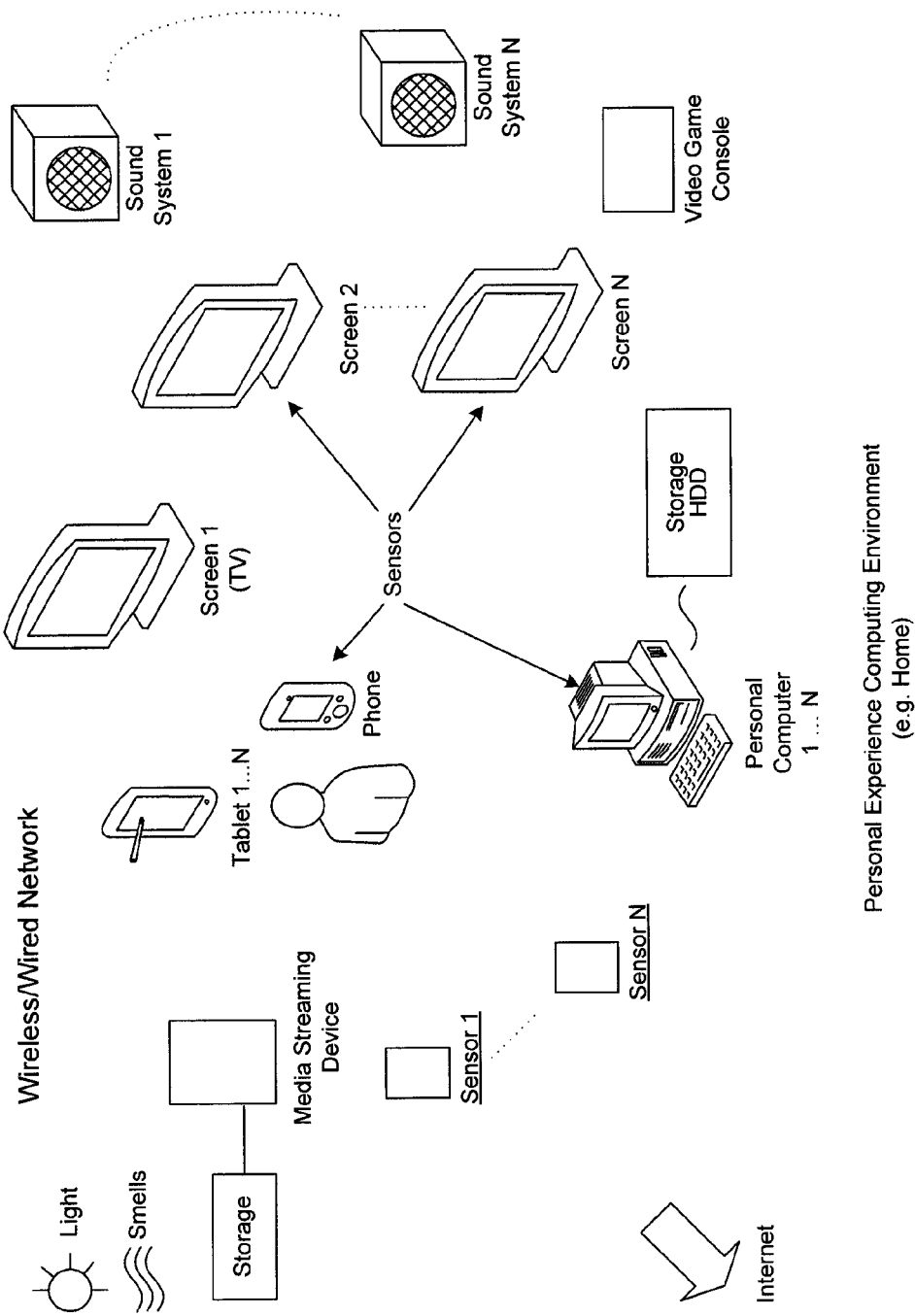
FIG. 2 is a block diagram of a personal experience computing environment
Figure 3:
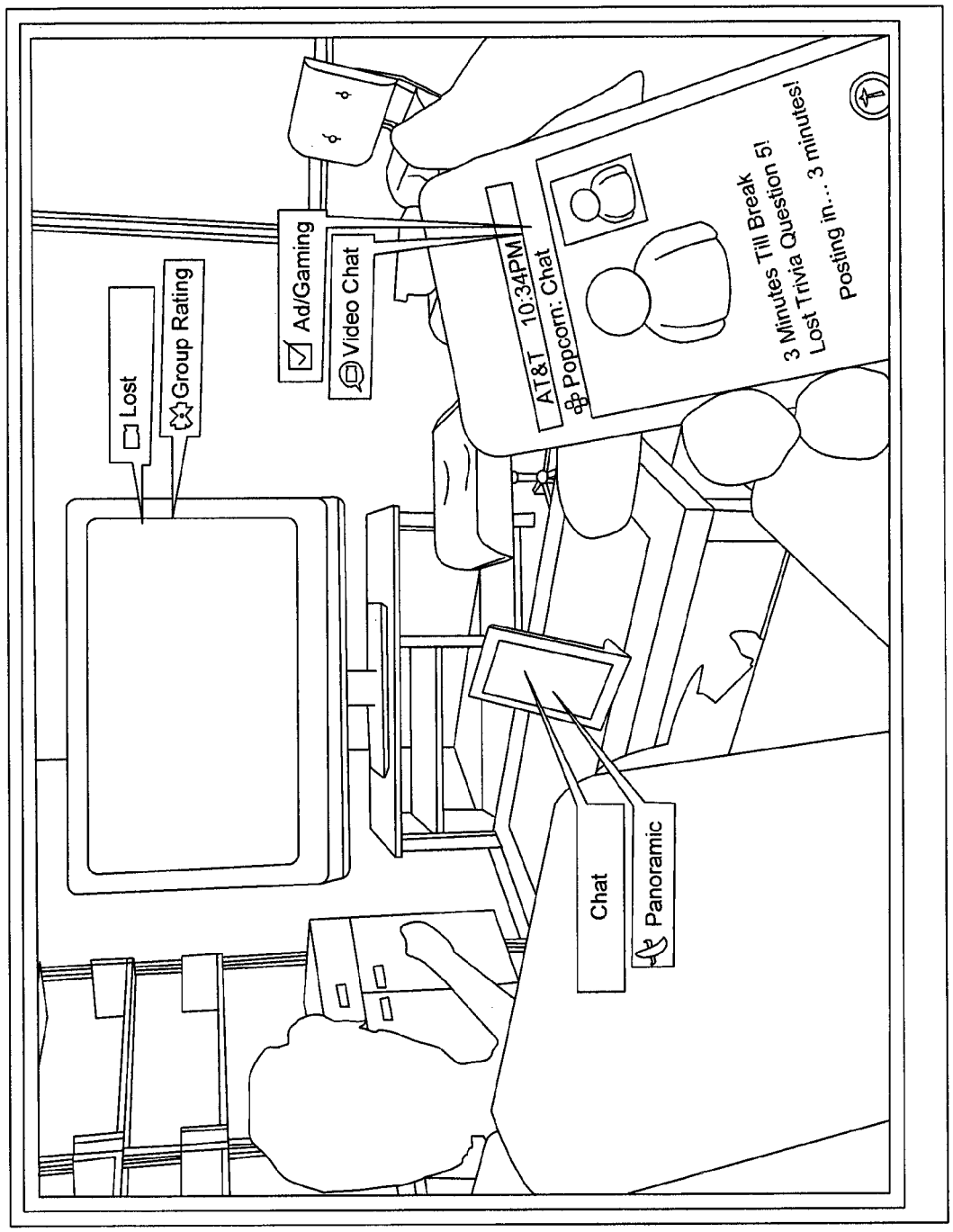
FIG. 3 illustrates an exemplary personal experience computing environment
Figure 4:
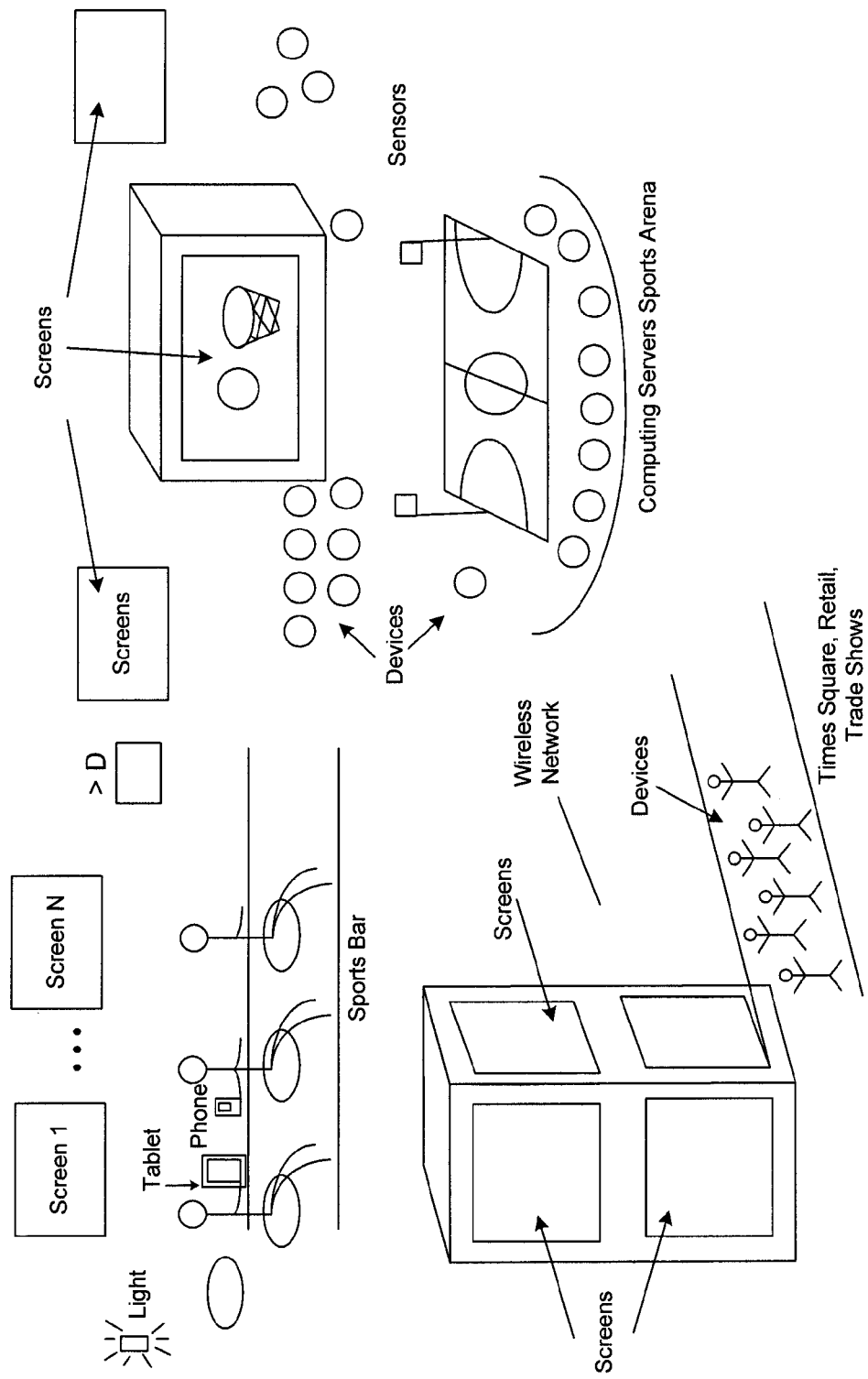
FIG. 4 is a block diagram of a public experience computing environment
Figure 5:
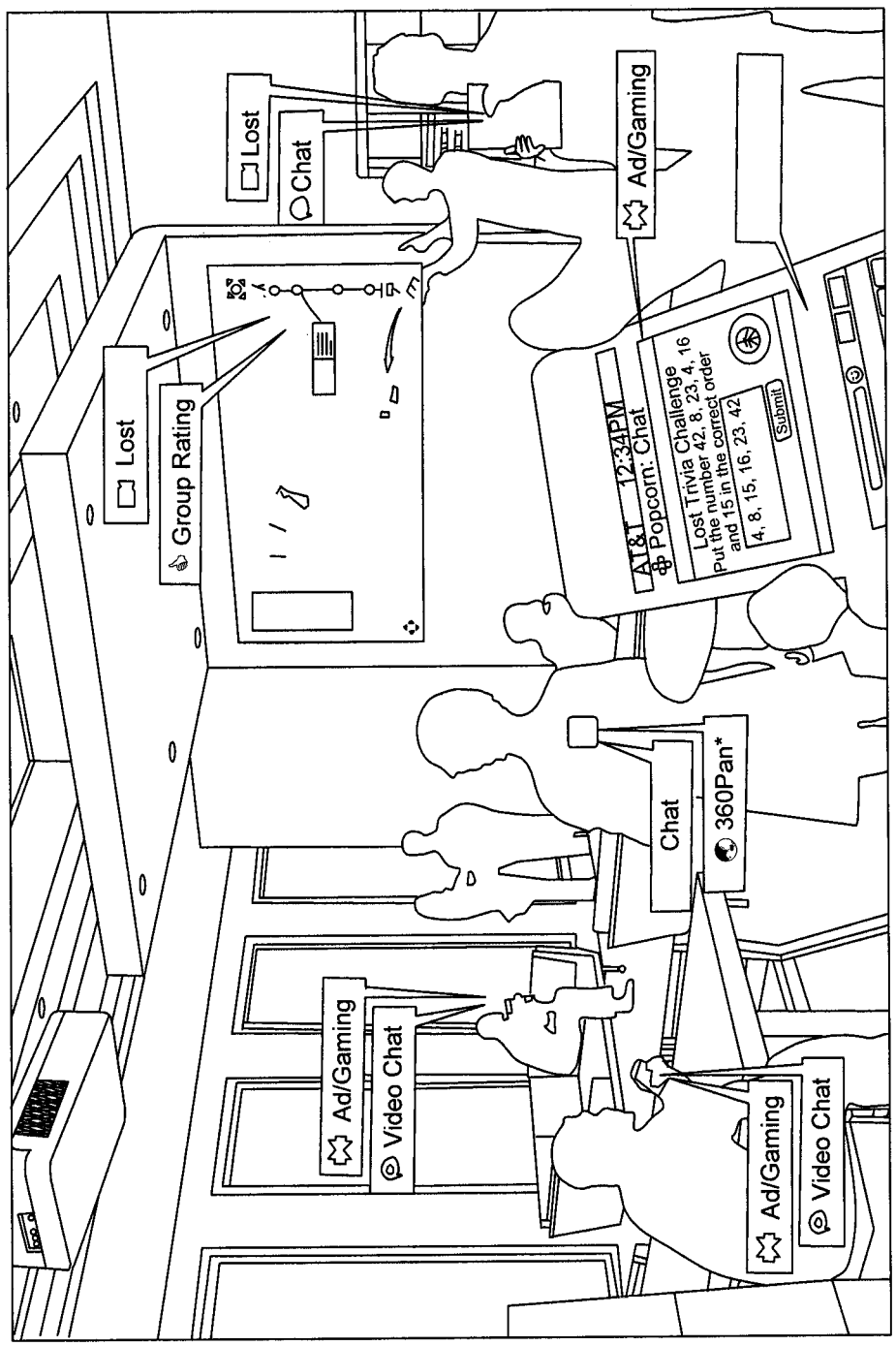
FIG. 5 illustrates an exemplary public experience computing environment
Figure 6:
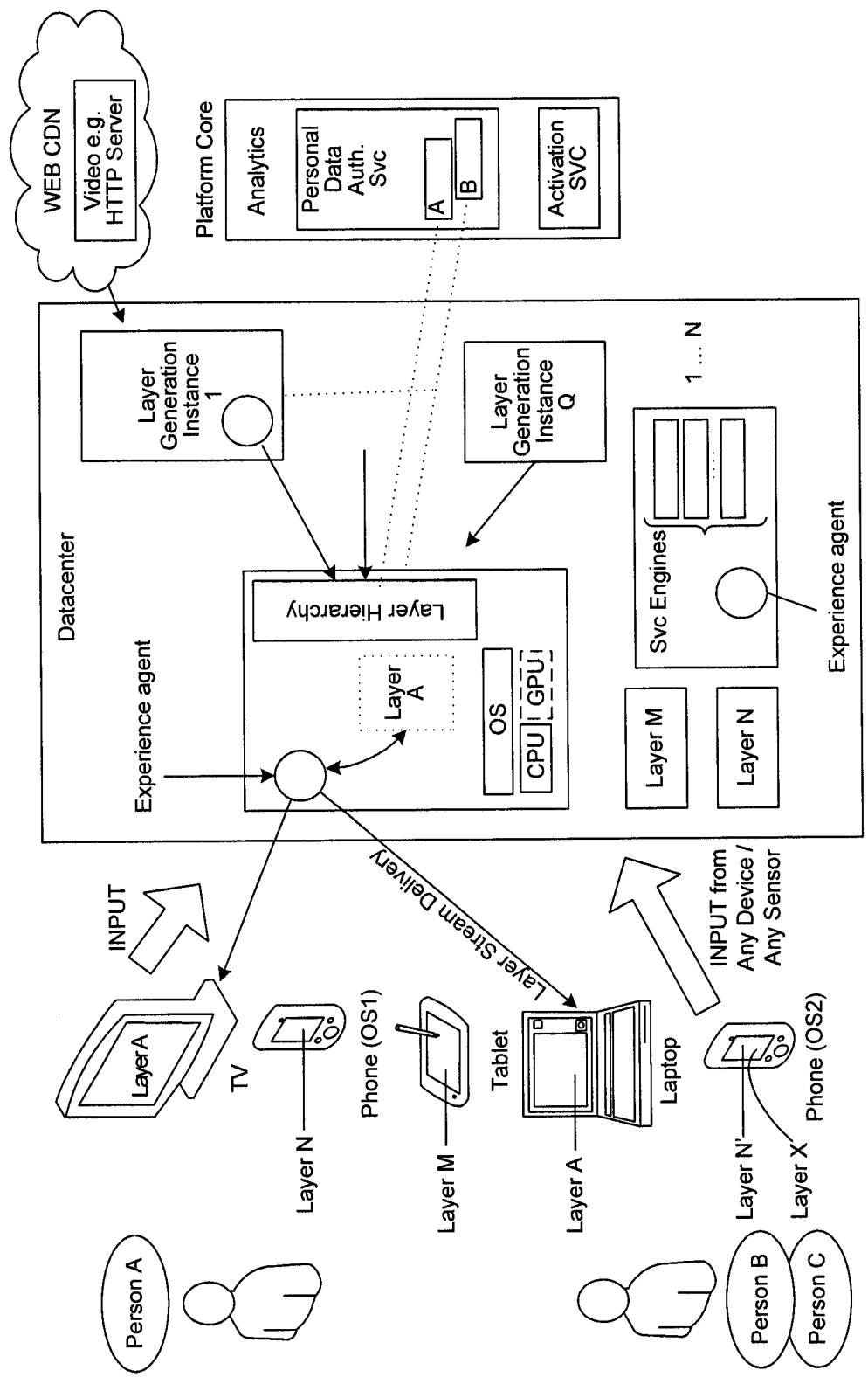
FIG. 6 illustrates an architecture of a capacity datacenter and a scenario of layer generation, splitting, remixing

FIG. 2 is a block diagram of a personal experience computing environment. FIG. 3 illustrates an exemplary personal experience computing environment. FIG. 4 is a block diagram of a public experience computing environment. FIG. 5 illustrates an exemplary public experience computing environment. FIG. 6 illustrates an architecture of a capacity data-center and a scenario of layer generation, splitting, remixing.

Figure 7:
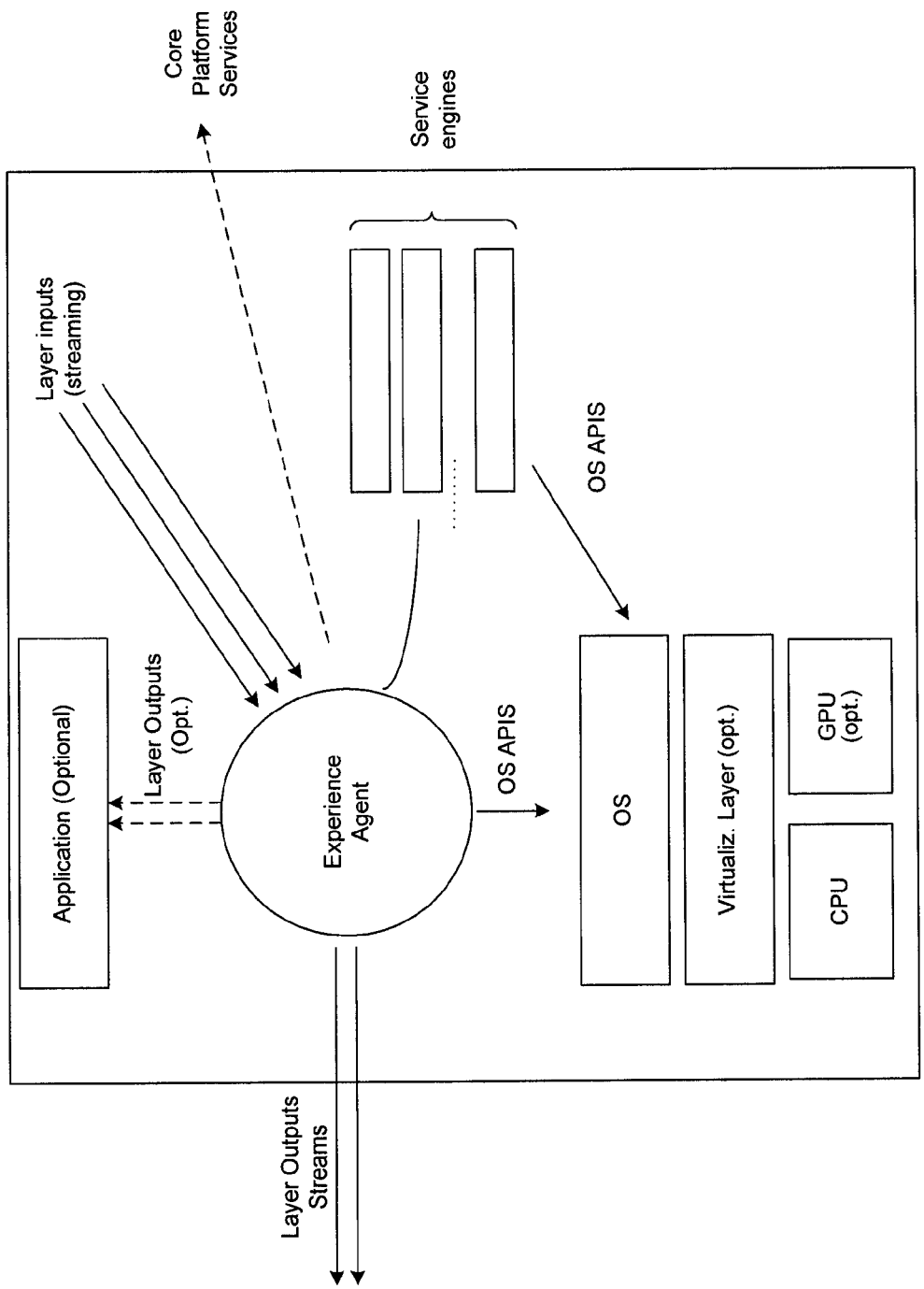
FIG. 7 illustrates an architecture of a computational node (server or device)

FIG. 7 illustrates an architecture of a computational node (server or device). FIG. 8 illustrates the structure of an experience agent.

Figure 9:
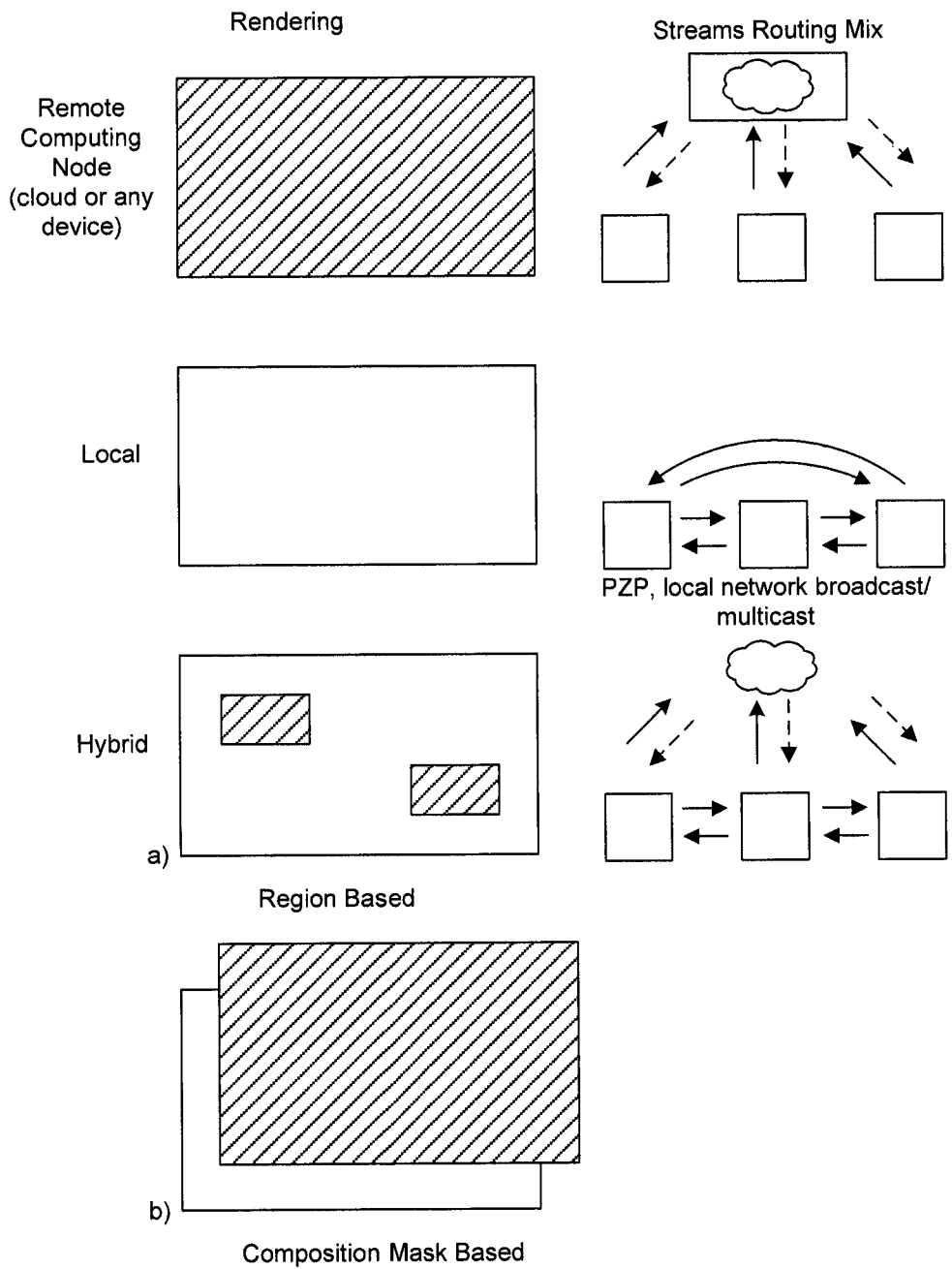
FIG. 9 depicts various layer types and data routing schemas.

FIG. 9 depicts various layer types and data routing schemas. FIG. 9 now illustrates a basic and illustrative example of an architecture of a local layer composition. In embodiments, there are four features relevant to the layers assist architecture. The first feature is layer composition. We will look a little above layer generation in our previous discussion about architecture, layer composition and generation. The second feature is layer mobility, which turns on how layers can be moved or shifted between devices, how they can be spilt, how the application can be split into multiple layers, how duplicate layers can create experiences that span multiple devices, etc. The third feature involves layer computation and data model and how such layers are routed. The fourth feature relates to layer outputs. Layer outputs relates to how layers produce outputs for other layers or for devices, how they take inputs from people or from other layers.

Figure 10:
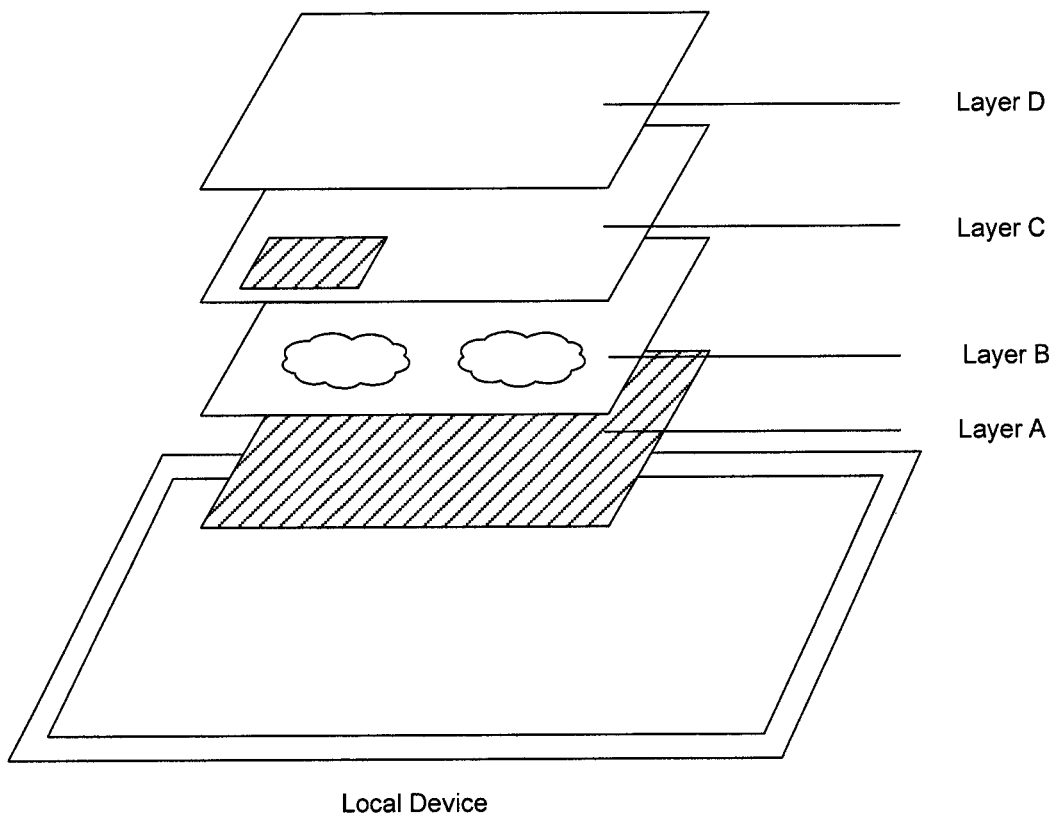
FIG. 10 illustrates an exemplary architecture of a local layer recombination (in this case—composition)
Figure 11:
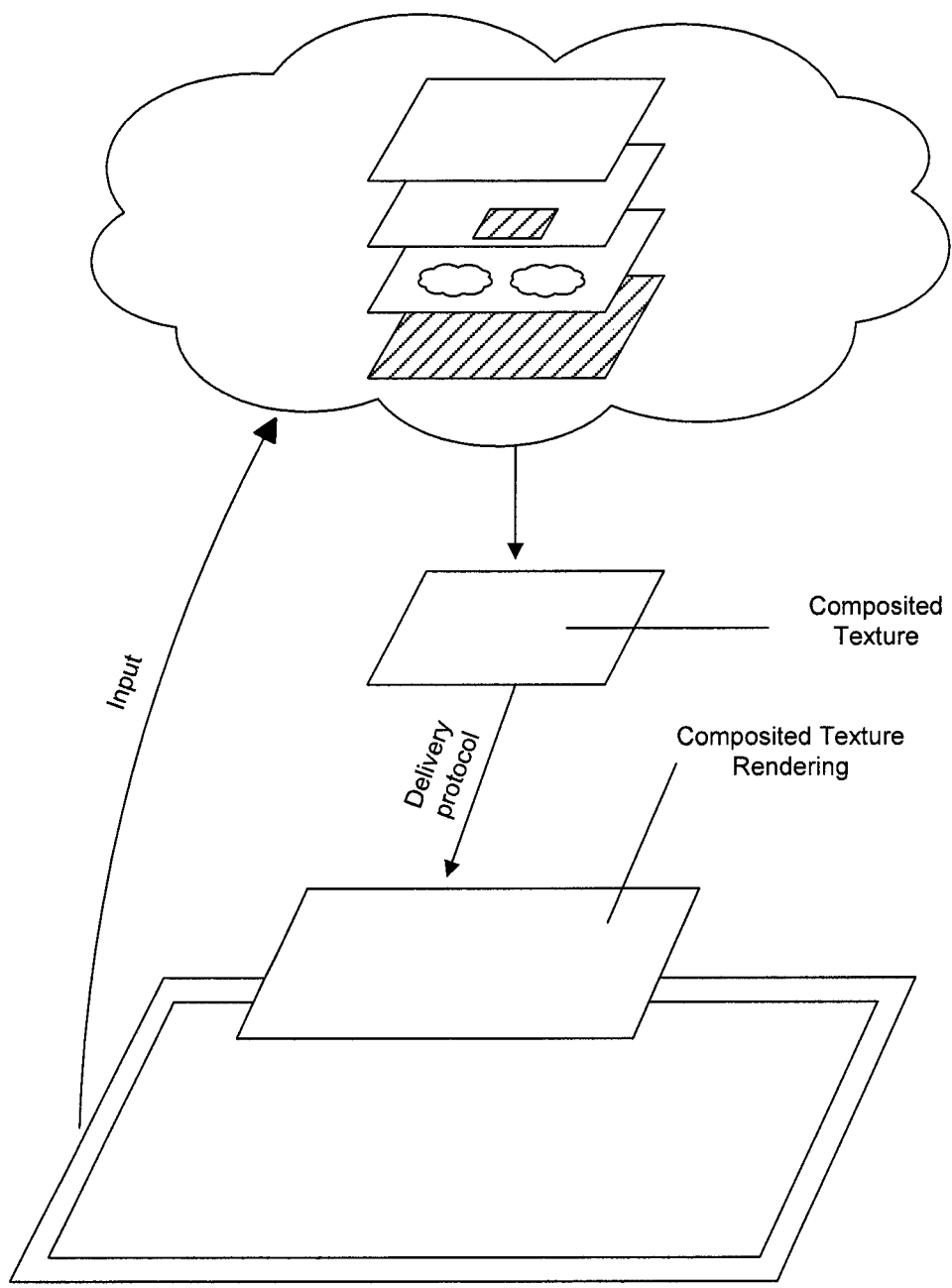
FIG. 11 illustrates cloud-level layer recombination (composition)

Layer Composition:

The first, layer composition, is described herein with reference to FIGS. 10 and 11. These figures illustrate, as an example, a tablet and layers associated therewith. In embodiments, layers may be composed using one or a combination of two different models—a local device composition and cloud or other such remote layer composition. In some instances, the layers may be composited in any way or order to result in a sequence of layers (e.g., where the layers are arranged one on top of each other). In such examples, layers may be composed using different levels of transparency, scaling, and such parameters may be reconfigured on the fly. In the case of a local setting, as is the case in FIG. 10, the layer may have a predefined schema that can be defined by the application, but still not limited to such a definition. In some instances, the layers or the predefined definitions can be dynamically rearranged. So the first layer is at the bottom, as exemplarily illustrated in FIG. 10. The next layer rendered on top of it and may be, for example, mixed using a GPU of the local computing device or other capabilities of the device. As illustrated herein, layer composition happens dynamically on the device. In the cloud layer composition or the remote layer composition, as exemplarily illustrated in FIG. 11, a similar construction happens on a remote site or device. Such a mechanism may be useful when a local device does not have complete capability to render one or more of the layers. This may be done dynamically when the local device's resources are unable to handle the composition or just be done remotely as preferred by a user. Any permutation of computations as may be envisioned by a person of ordinary skill in the art may also additionally be utilized.

Figure 15:
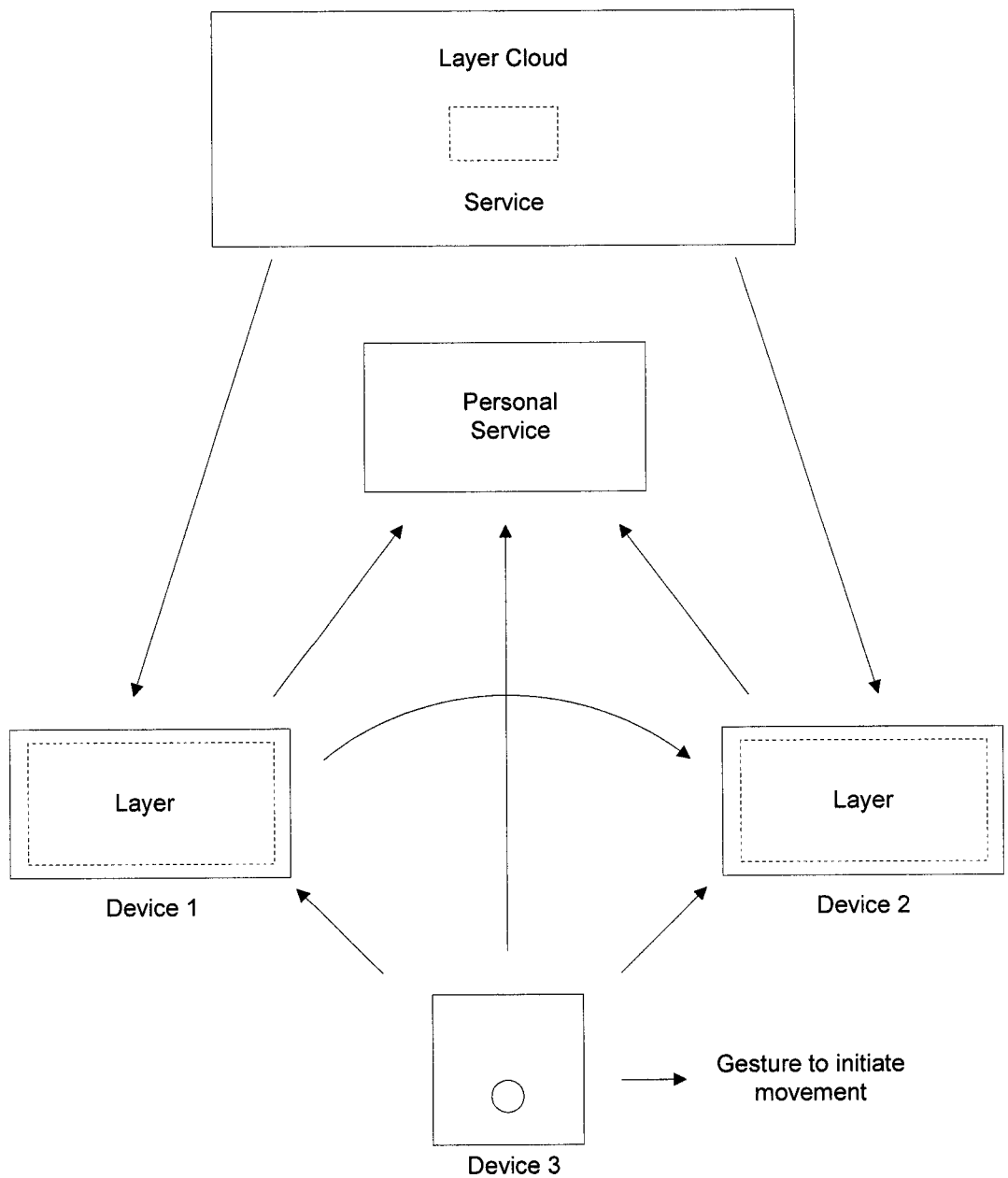
FIG. 15 illustrates a block diagram for layer movement, duplication across devices.

Layer Mobility:

The next feature is the mobility and the ability of the layer to move across devices and, for example, be present simultaneously across different consumer devices. In embodiments, such mobility allow for flare virtualization across the devices. Layer mobility is further discussed with reference to FIG. 15. In the illustrated embodiment, three exemplary devices are shown—device 1, device 2 and device 3. In an exemplary embodiment involving device 1 and device 2, a first layer generated on the first device. Consider a scenario where an experience is generated and functional, and then a person associated with device 3 initiates a gesture or other trigger or input method to cause an event to occur. In such a scenario, device 3 may talk to device 1 or it may directly talk to a personal service. Personal and consideration service is part of the platform that holds all of the integration configuration data for specific people and knows exactly all the available information about how many devices does it have, what networks do they have working on and all the parameters. Accordingly, this can be identified dynamically so the personal service is constantly talking to each device and send out the routing mechanism.

Consider, for instance, that in the above example all three devices are located in the network. Once the device connected to the personal service, personal service can send the device (or each device) this information so in local network they can communicate to each other and they can just simply establish direct links and initiate all this movement and other operations by conveying personal service. Another example is where the devices are located in the same geographical location but just connected to different WIFI or wired networks and there is no direct link. Here, the devices would instead communicate through the personal service. Anyway, regardless of this mechanism, the end result will be the device 3 initiates the signal both to destination device (in this case device 2), and the source device. It basically informs the device that they should prepare for layered movement. They, those who communicate through the service wishes according service to this layer. As an additional example, let's say we have some layer created in the cloud. In this case, device number 3 tells device number 2 to accept the specific request which indicate a particular layer, and device number 1 will be ready for layer movement. This device can talk to each other to accept and to identify how layer movement is progressing. The devices may synchronize the animation between device 1 and device 2, how the layer disappears on the first and appears on the second device. And finally the layer on device 1 moves to device number 2. The important part is both devices are connected to the service which is responsible for work under this layer, so this communication, this transmission can happen in either direction. As far as the layer is concerned, the same mechanism can be applied from layer application—it just simply communicates to according service in the cloud to send identical or device specific stream which contains this layer to another device. The layer movement feature is important because if an application is composed of multiple layers, layers can be split so one layer can go on the tablet device and another layer can go on the TV device and they can adapt based on the devices and this allows for experiences that can be split across devices.

Layer Computation:

The next feature is the computation model of the layer, where all the computation for this layer happens and the data exchange mechanism for this layer. Reference is made to FIG. 9 which introduces an exemplary architecture and structure. The first layer, in this example, may be complete configured in the cloud (this is the top left corner). In this case layer can be completely generated within the cloud. It can be a remote application generated on the cloud server and the game or application working completely there and fully computer generated and work in normal mode. Using remote delivery mechanisms, the game or application may then be captured and delivered to the cloud. In other examples, it is understood that the application can be generated locally using capabilities the devices has. In examples, where the layer can be generated simultaneously, part of this layer can be generated on the cloud and part of the layer can be generated locally on the device. Generated in the cloud may include any computational resource remotely or locally available. So let's say you have two devices in your physical location, mobile phone and powerful computer, and you are using mostly your phone and layer can be generate part of the layer, specific to the phone, can be generated on the phone like control button, touch events and touch controls. But the other part can be generated (let's say we consider map application and powerful machine can render 3D map) and just have the information sent to the device. "Cloud" implies another computational unit regardless of its location and other parameters. The interesting part of this is a hybrid layer under part of the layer generated locally and part of layer generated remotely. In embodiments, this can be region-based which is simple model so part of the layer just local and part of the layer generate and delivered to the regions. It could be based on the mask so let's say we have generated two pictures and they can mix with different types of transparency and work very well even when there is a lot of movement. In this case a computational-mask based approach may be utilized so one part of the layer generated locally and the other part in the cloud and are then mixed together in the device.

Data layers may be sent as data streams and event streams that can be, for example, transmitted through the cloud. In embodiments, each layer transmits to a remote computing node all the data and communicates only to that node. In some examples, each layer, and further in some examples, each instance of such layers, may work exactly on the same model so as to offer a central point of communication that is publicly accessible through good bandwidths and other network capabilities. This exemplary embodiment offers a single point of routing. In other embodiments, a "peering network" may be used, where devices talk with each other for such communication offerings. In a third embodiment, a possible approach is combination of the two previous approaches, e.g., in a scenario where we have three persons located, and each of the persons has three devices. Each device is located, for example, in the same wi-fi network, so the devices can communicate locally, but when it comes to communication across the local network the cloud model may be adopted.

Figure 16:
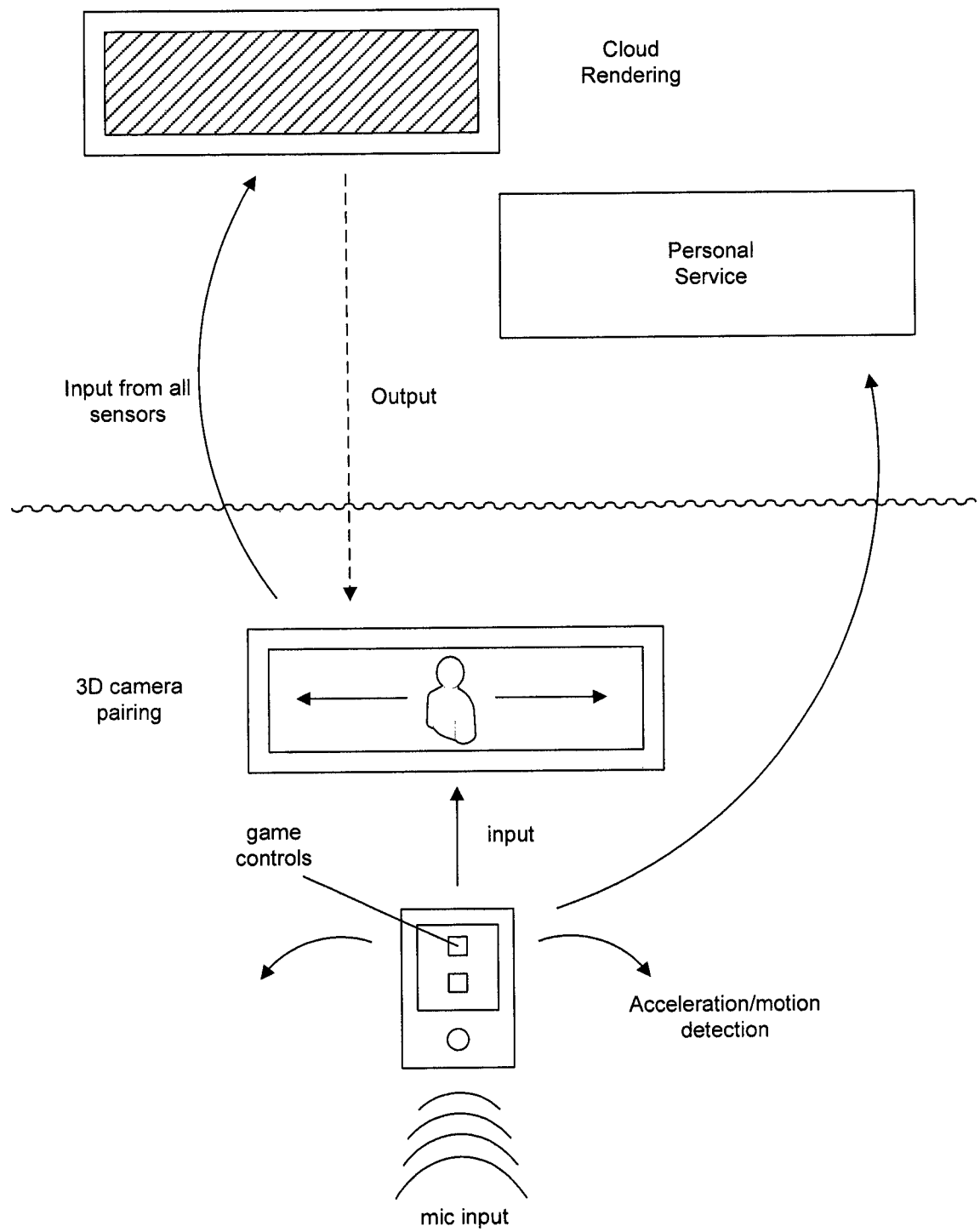
FIG. 16 illustrates layer multiple inputs to a layer from multiple devices and affecting a cloud-based layer
Figure 17:
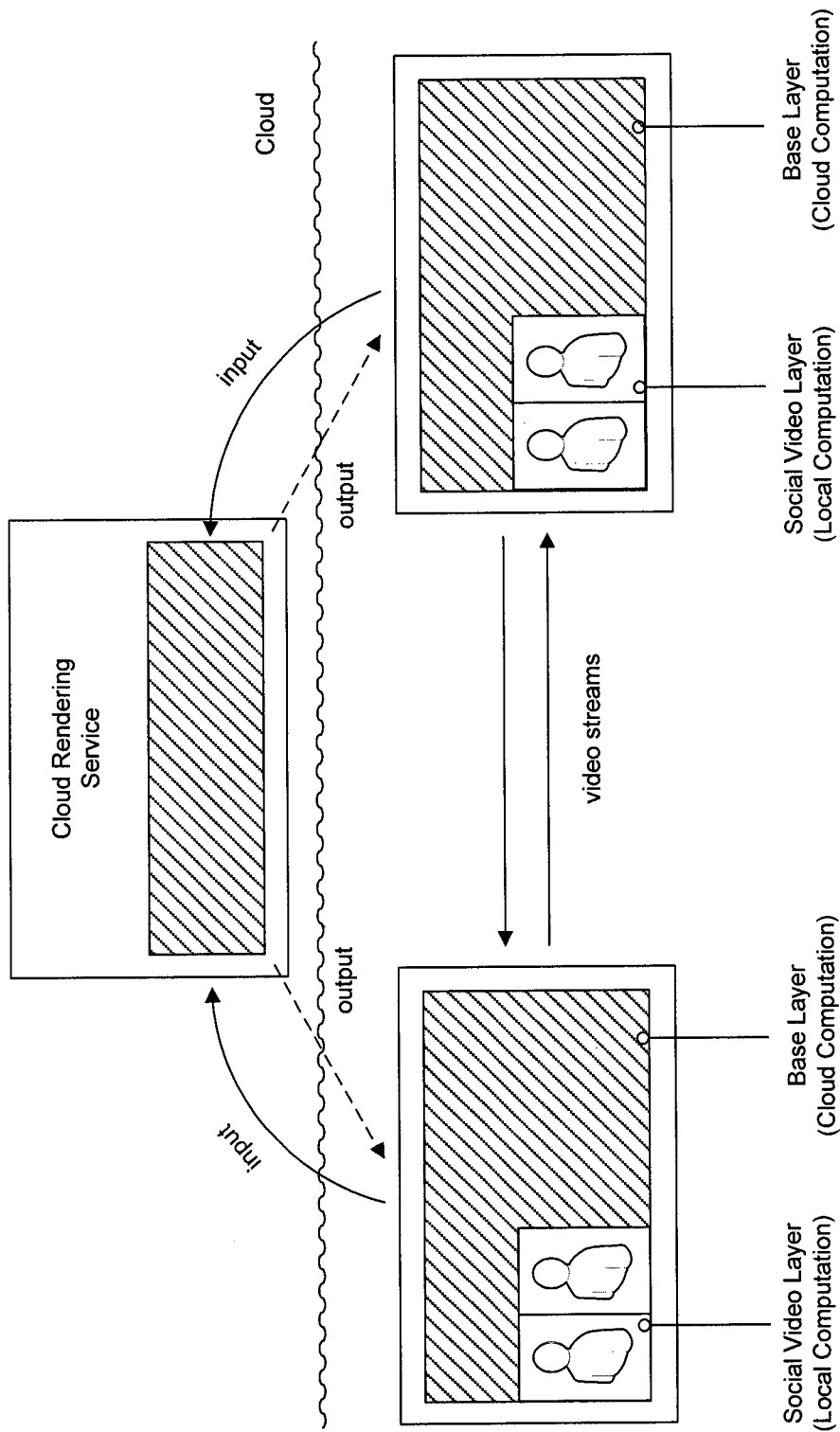
FIG. 17 illustrates a block diagram of mixing cloud-rendered layer with social video layer
Figure 18:
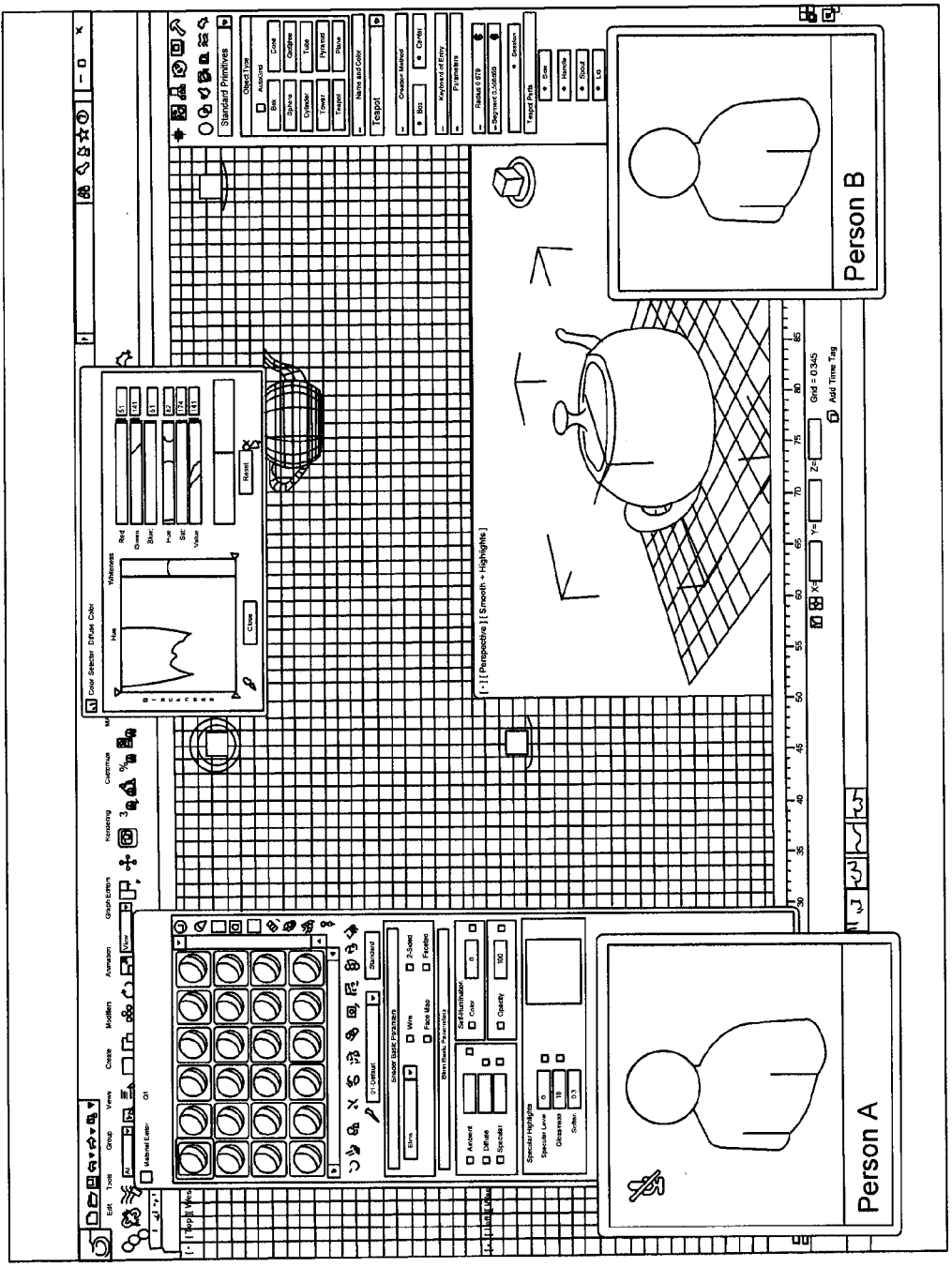
FIG. 18 illustrates an example of mixing cloud-rendered application layer with social video layer
Figure 19:
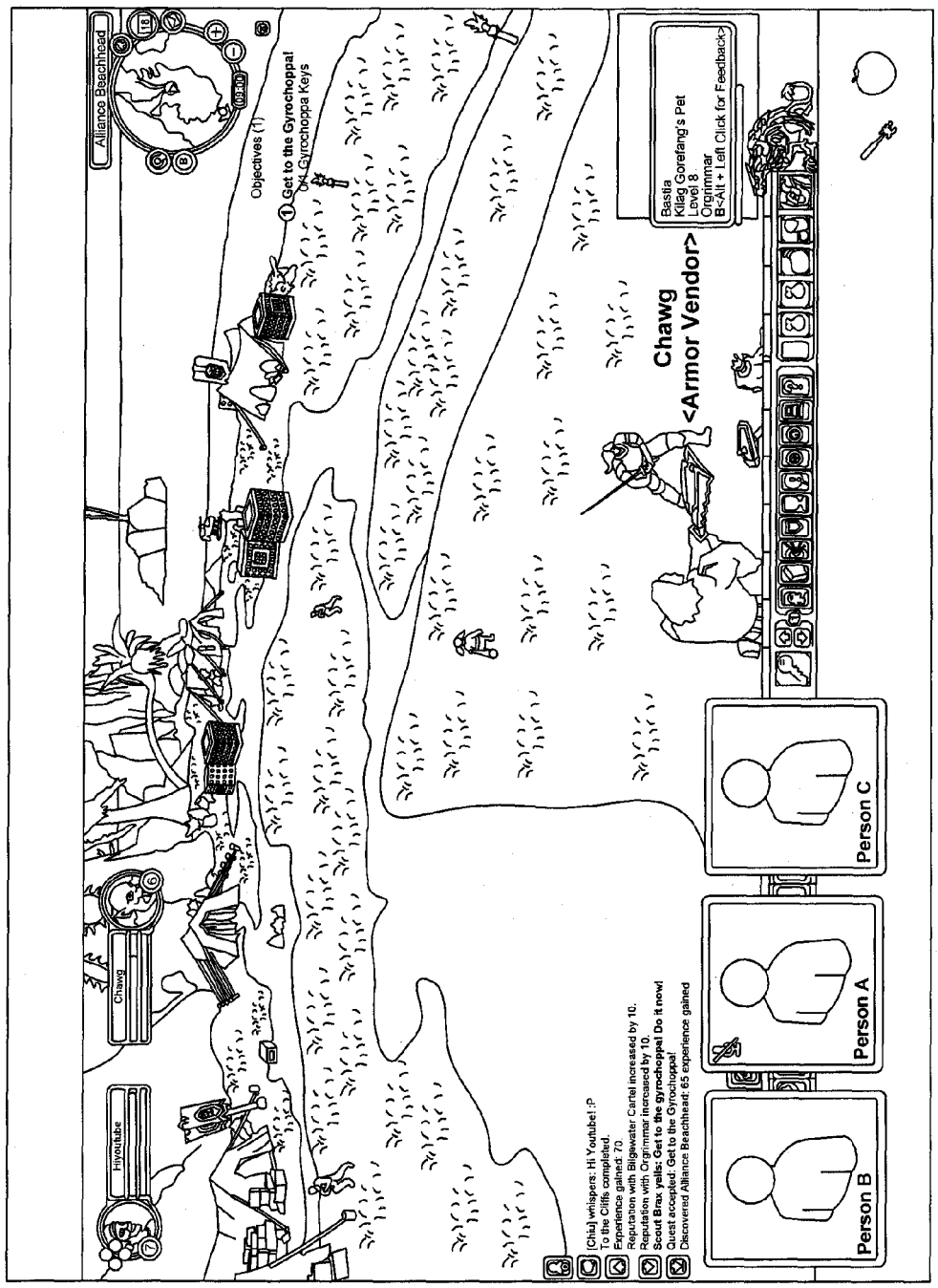
FIG. 19 illustrates an example of mixing cloud rendered game layer with social video layer
Figure 20:
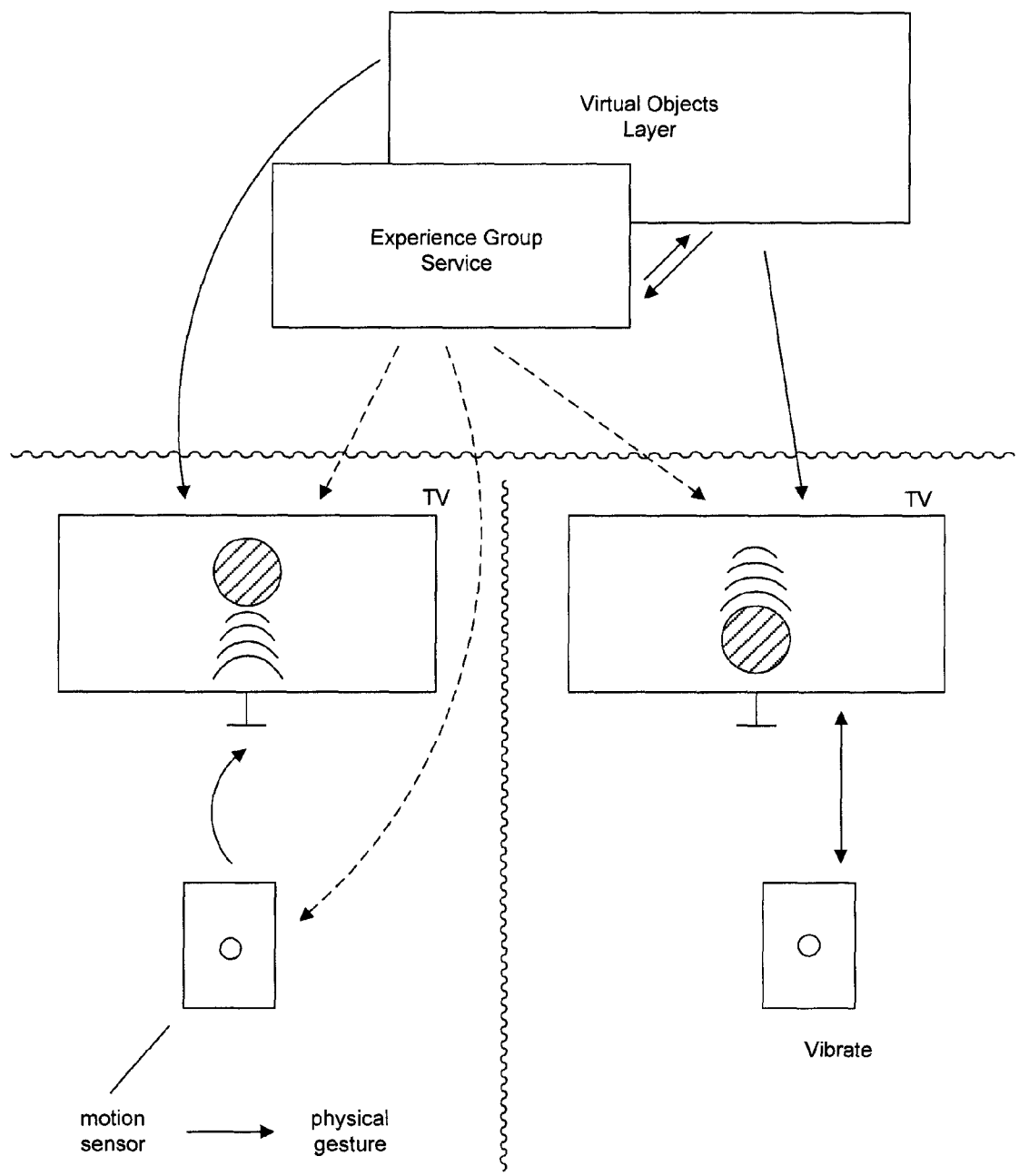
FIG. 20 illustrates a block diagram of an exemplary layer interaction (virtual experience)
Figure 21:
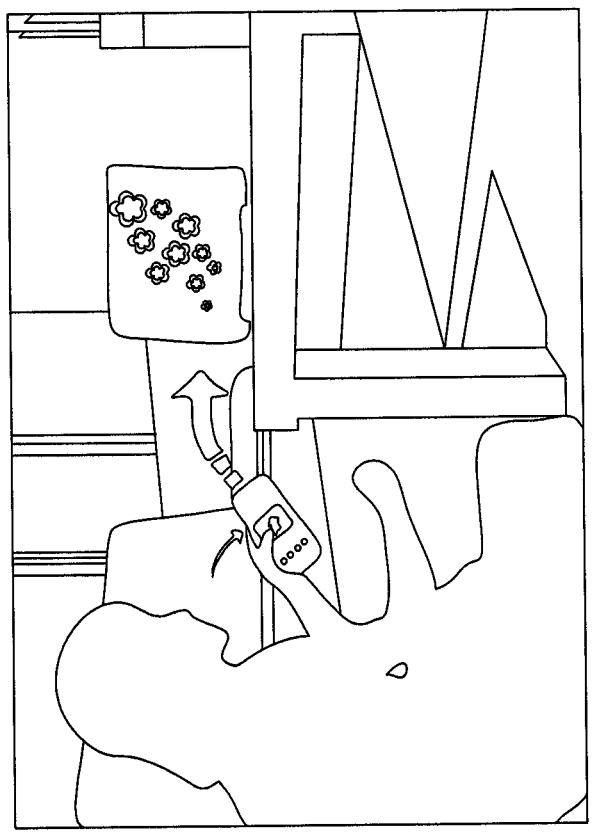
FIG. 21 illustrates an exemplary user interaction and layer interface (virtual experience)
Figure 22:
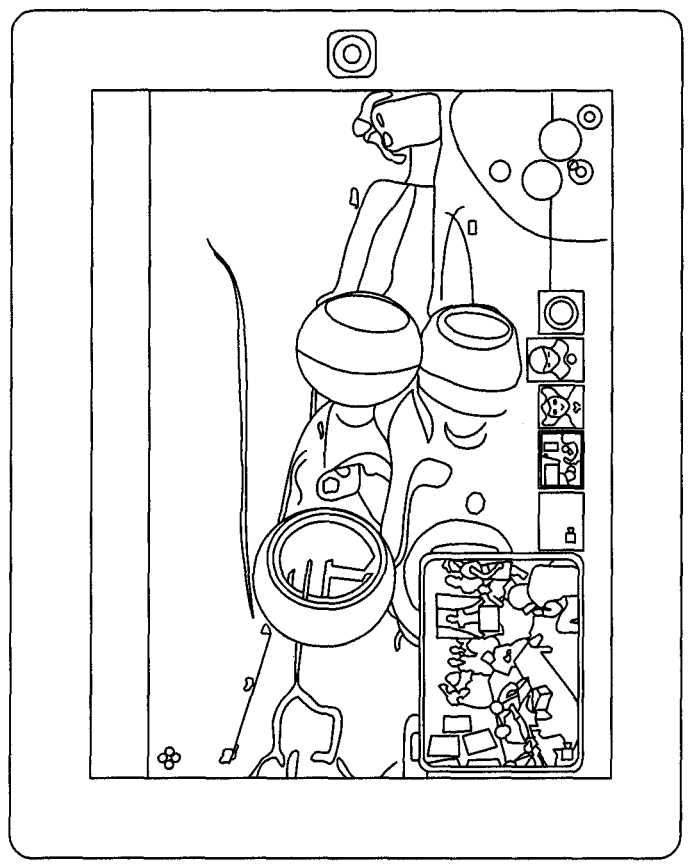
FIG. 22 illustrate an exemplary "swell" layer
Figure 23:
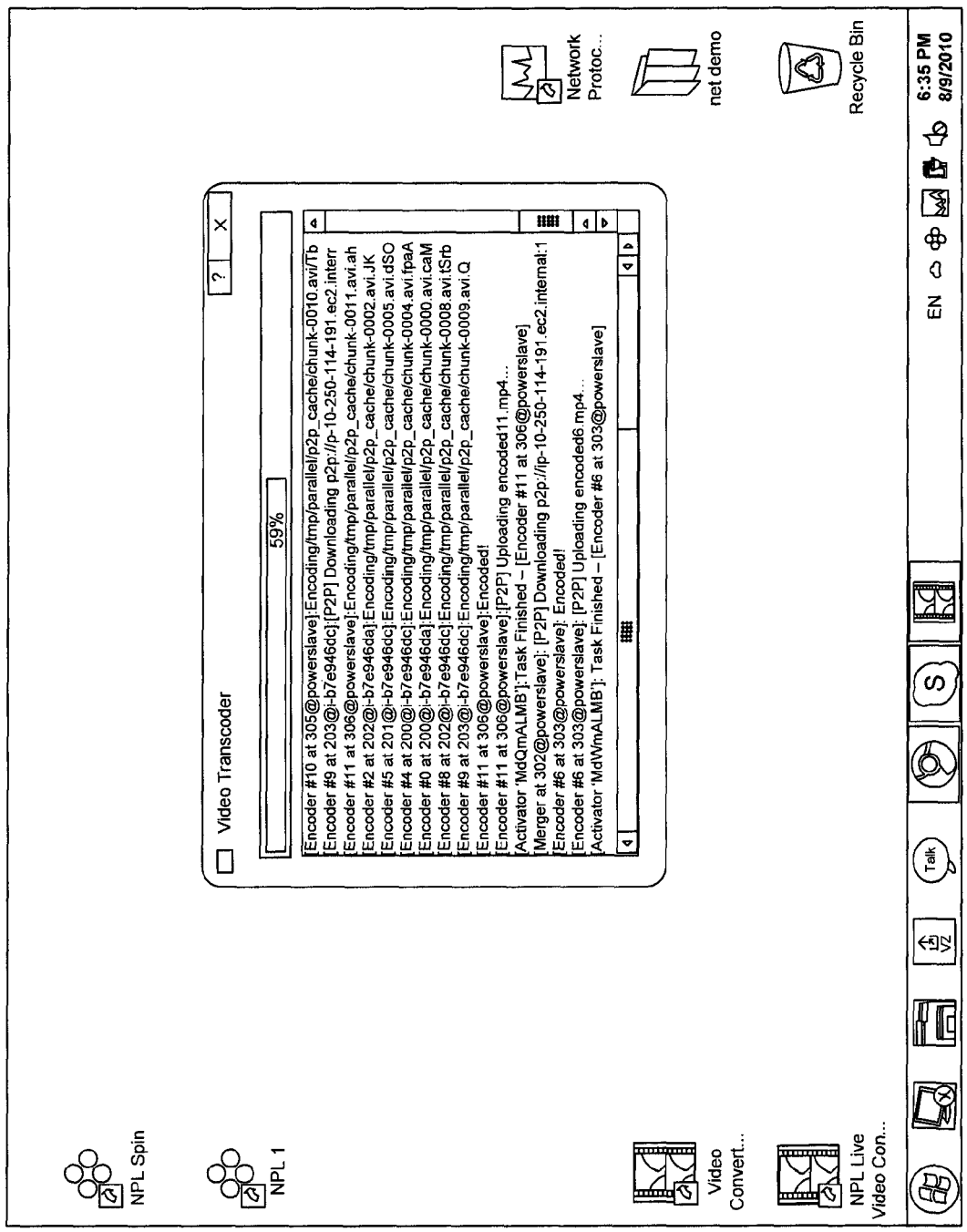
Figure 25:
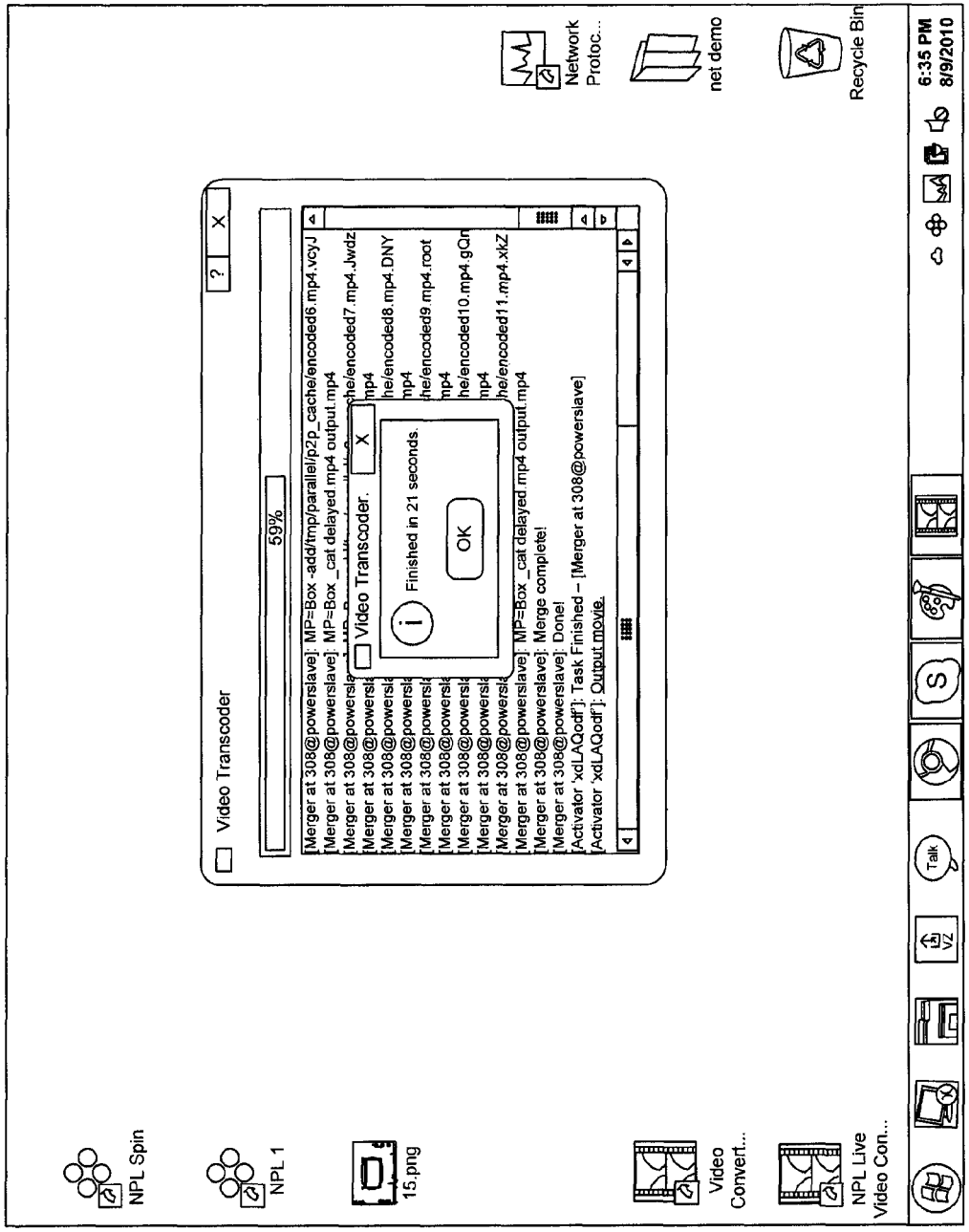

Layer Outputs:

FIG. 16 now illustrates i/o, input and output for layers. So layers can accept inputs from other layers or from people and generic outputs so they can be re-combined. The illustrated example describes input/output cases. FIG. 16 illustrates a multi-device, multi-layer embodiment. Let's consider an exemplary embodiment where we have television and mobile phone, and we have a game which is regularly on TV. Let's say it's a first shooter game. This game may be controlled using your mobile phone so you can rotate, 3D pan in 360 degrees, use a camera, etc. When a gesture or any other type of input is provide, for example, let's say it initiates a movement in the game. And also you can see alternatively for you from your mobile phone. So let's say you can see the map of the game on the mobile phone while you see the main view on the big screen TV. This is a specific example but let's consider how it can be done through the Layer Model. We have game, or specific layer, executed somewhere, either remotely or locally on the device, on one device. And we have another device which talks and gives to the personal service or configuration service which gets this information routes and schemes and it spans this direct connection between two devices. The layers accept both from two devices, so a user can play using the native device (e.g., the mobile device), or could also play using the TV (assuming TV has input mechanisms such as a keyboard). The user can play from that keyboard and also the other device since the input information to this layer, depending on the layer of the routes and schemes. Accordingly, in embodiments, the information may be directly sent to the device or through the cloud depending on the layer computational model. This second device can send data to direct it to the local device where layer originated or directed to the cloud part which layer computation or to them both.

In this illustrated scenario, the conveyed idea is that even if the game or application or layer wasn't designed for that such type of an input, it can be meta-schema implemented to be able to work with such type of input. So, without any modification to the layer or application agent, and with just a configuration file which basically establishes the map between the input and parameters of the unit to the application specific actions, the required objectives are easily met. In another example, we have a PC based game and it knows how to react to the mouse movement, but then we add an accelerated method from the mobile phone and we can just simply map the rotation of the view of the main character in the game to accelerated motion of the phone. So when a user rotates the phone, it will rotate the main view. This illustrates how this schema is important to extend input capabilities for initial application layers.

Figure 12:
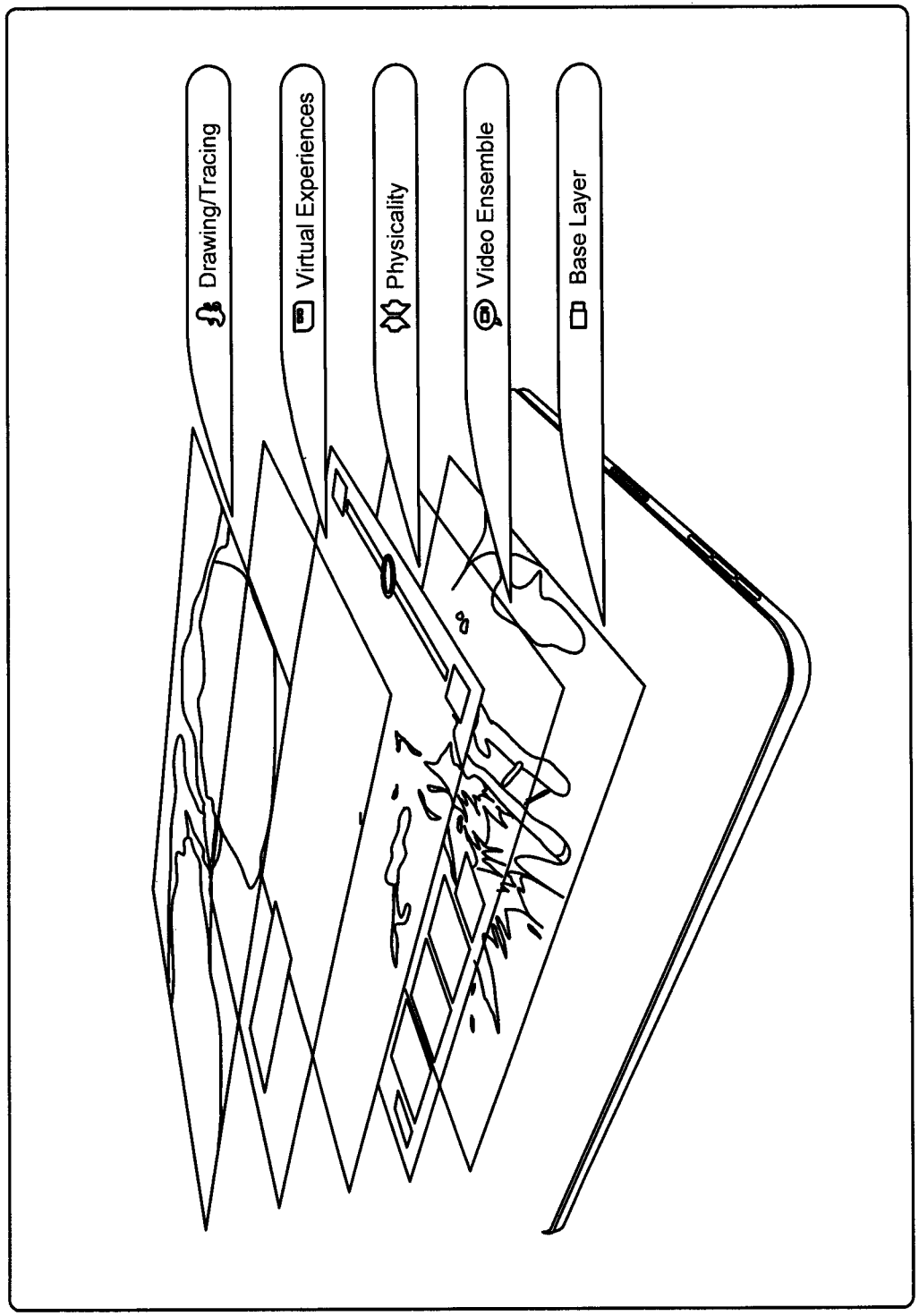
FIG. 12 illustrates an exemplary specific layer recombination (composition)
Figure 13:
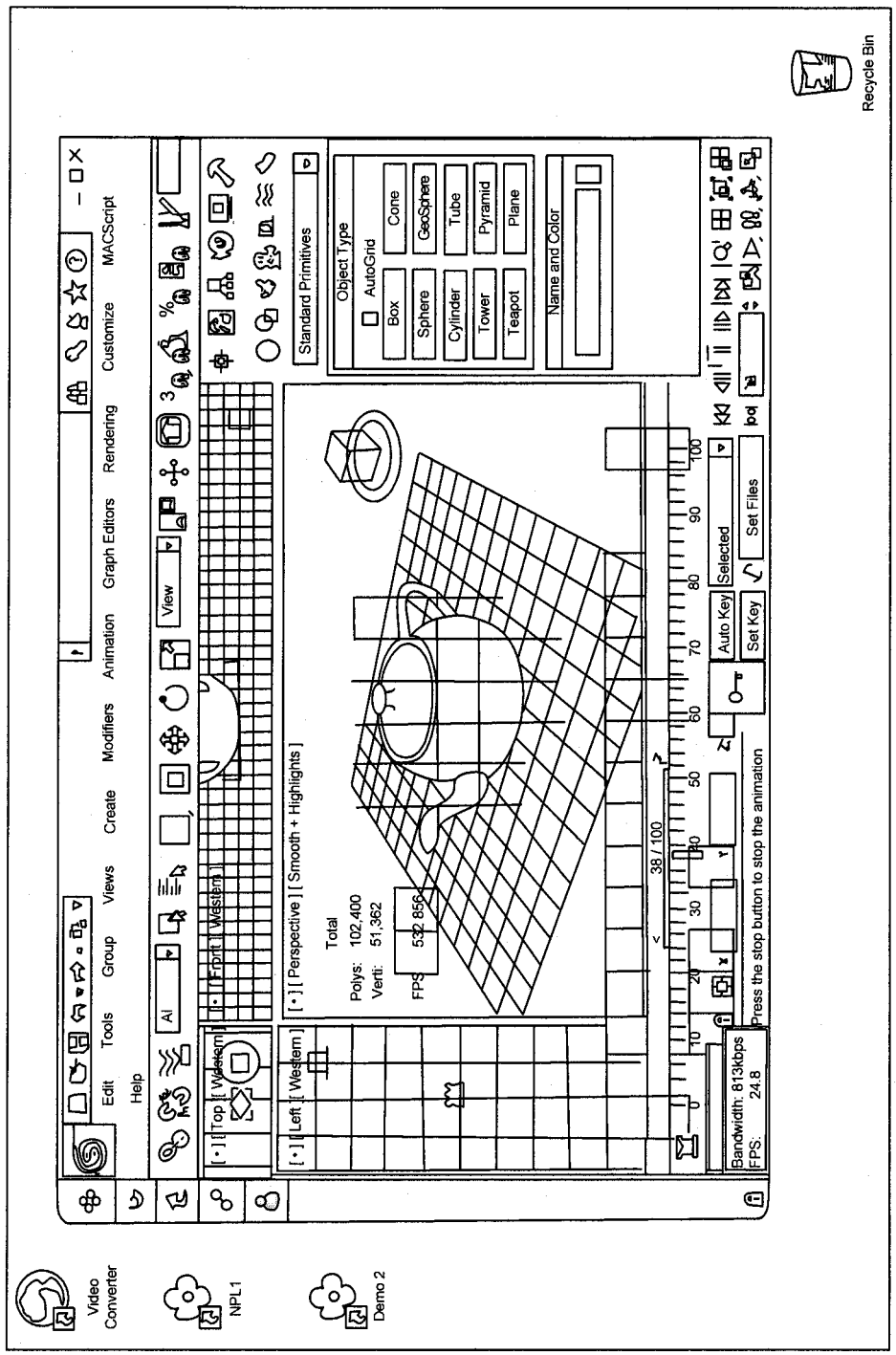
FIG. 13 illustrates an exemplary cloud-level layer recombination (composition)
Figure 14:
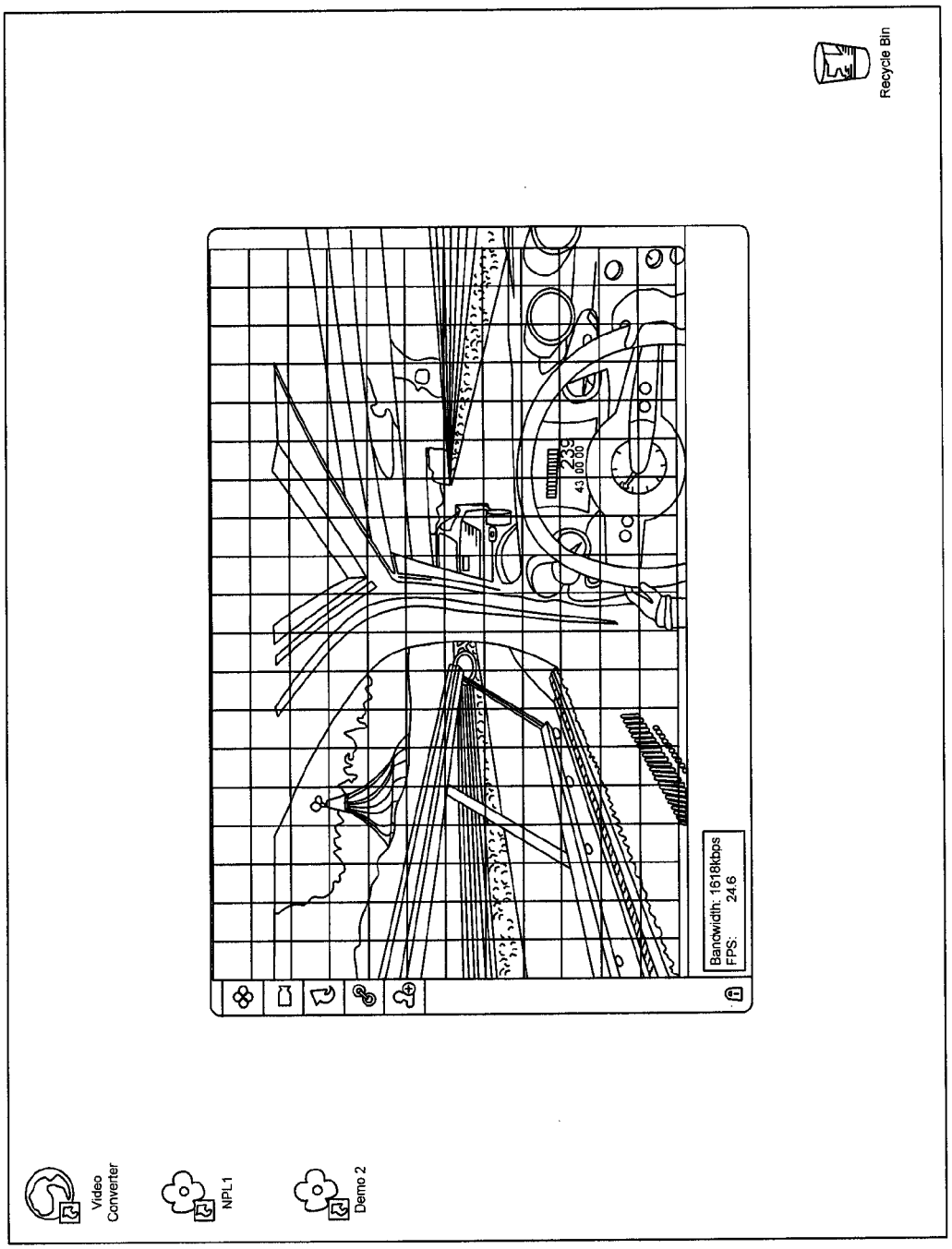
FIG. 14 illustrates an exemplary cloud-level layer recombination (composition)

FIGS. 12-14 above depict very basic and nascent illustrations of experiences that utilize the local layer composition principles discussed above. For example, FIGS. 12 and 13 provide basic examples of experiences showing 4 illustrative layers. In embodiments, a first layer is generated by Autodesk 3ds Max (FIG. 4) or EA's "Need for Speed" instantiated on an experience server (this is a platform service that transforms an existing windows application as a layer). In some instances, a second layer is an interactive frame around the 3ds Max layer, and in this example is generated on a client device by an experience agent. Similarly, for example, a third layer is the black box in the bottom-left corner with the text "FPS" and "bandwidth", and is generated on the client device but pulls data by accessing a service engine available on the service platform. The fourth layer is a red-green-yellow grid which demonstrates technical information (e.g., different regions being selectively encoded) and is generated and computed on the service platform, and then merged with the 3ds Max layer on the experience server. In the example on FIG. 13. a layer generated by Microsoft PowerPont application is locally combined with a simple video chat layer employing p2p stream routing model.

FIGS. 4-5 provide an example experience showing 4 layers. A first layer is generated Autodesk 3ds Max instantiated on a suitable layer source, such as on an experience server or a content server. A second layer is an interactive frame around the 3ds Max layer, and in this example is generated on a client device by an experience agent. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the 3ds Max layer on the experience server.

FIGS. 6-7, similar to FIGS. 4-5, show four layers, but in this case instead of a 3ds Max base layer, a first layer is generated by piece of code developed by EA and called "Need for Speed." A second layer is an interactive frame around the Need for Speed layer, and may be generated on a client device by an experience agent, on the service platform, or on the experience platform. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the Need for Speed layer on the experience server.

FIGS. 8-9 illustrate a base layer being a movie with DRM protection provided by iTunes/Apple iTunes store, the base layer here being provided by a video server, and merged on the experience platform.

FIGS. 21-25 show a demonstration of a video transcoding service utilized by the transcoding application, and incorporating a third-party service. Implementation of the transcoding service can be built, for example, on top of Amazon Web Services. In particular, this illustrates distributing the video transcoding service over a plurality of virtual machines instantiated by the third-party service.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

An application programming interface (API) is an interface which defines available services, and enables the different agents to communicate with one another and request services. A sentio codec is a combination of hardware and/or software which enables encoding of many types of data streams for operation such as transmission and storage, and decoding for operations such as playback and editing. The sentio codec provides the capability of encoding data streams corresponding to many different senses or dimensions of an experience. These data streams can include standard data such as video and audio. Additionally, the data can include graphics, sensor data, gesture data, and emotion data. ("Sentio" is Latin roughly corresponding to perception or to perceive with one's senses, hence the nomenclature "sensio codec."). The sentio codec includes a plurality of codecs such as video codecs, audio codecs, graphic language codecs, sensor data codecs, and emotion codecs. The sentio codec further includes a quality of service (QoS) decision engine and a network engine. The codecs, the QoS decision engine, and the network engine work together to encode one or more data streams and transmit the encoded data according to a low-latency transfer protocol supporting the various encoded data types.

The service platform includes at least one of experience agent, a plurality of service engines, third party service engines, and a monetization engine. In some embodiments, each service engine has a unique, corresponding experience agent. In other embodiments, a single experience agent can support multiple service engines. The service engines can be instantiated on one server, or can be distributed across multiple servers. The service engines correspond to engines generated by the service provider and can provide services such as audio remixing, gesture recognition, and other services referred to in the context of dimensions above, etc. Third party service engines are services included in the service platform by other parties. The service platform may have the third-party service engines instantiated directly therein, or within the service platform these may correspond to proxies which in turn make calls to servers under control of the third-parties.

What is claimed is:

1. A system for composing and directing multi-dimensional participant experiences, the system facilitated via a low-latency transmission protocol and sentio codecs for encoding and decoding multi-dimensional data streams, the system provided by a service provider for use by an experience provider, the system comprising:

a plurality of devices, wherein each device includes a specific experience agent, each specific experience agent including a specific API and a specific sentio codec;

an experience server in communication with the plurality of devices, the experience server including:
  a first experience agent, the first experience agent including a first API and a first sentio codec; and
  an experience composition engine;
a content server in communication with the experience server and operable to provide a first content layer to the experience composition engine;
a service platform in communication with and operable to provide services to the plurality of devices and the experience server, the service platform including:
  a plurality of service engines; and
  a second experience agent including a second API and a second sentio codec, the service of at least one service engine exposed via the second API; and
wherein, the experience composition engine is operable to:
  receive layers from the content server and the plurality of devices;
  request services from the service platform via the first experience agent; and
  compose and direct the layers using services performed by the service platform into a participant experience to be presented on a device.

2. A system as recited in claim 1, wherein the plurality of devices are in communication via a wireless network.

3. A system as recited in claim 2, wherein a single participant is using the plurality of devices for a heterogeneous experience.

4. A system as recited in claim 1, wherein a plurality of participants are involved in the participant experience via the plurality of devices.

5. A system as recited in claim 1, wherein the specific experience agent instantiated on each specific device is programmed according to operational capabilities of each specific device.

6. A system as recited in claim 1, wherein the experience server, the service platform, and the content server are in a data center.

7. A system as recited in claim 6, wherein the data center is distributed.

8. A system as recited in claim 1, wherein the first content layer provided by the content server is video content.

9. A system as recited in claim 1 further comprising an ad server in communication with the experience server and operable to provide a second content layer to the experience composition engine, the second layer including at least one advertisement.

10. A system as recited in claim 1, wherein the plurality of service engines include a first set of service engines provided by the service provider.

11. A system as recited in claim 10, wherein the plurality of service engines include a second set of service engines provided by one or more third-parties.

12. A system as recited in claim 10, wherein the service provider charges the experience provider for utilization of the service engines.

13. A system as recited in claim 11, wherein the service provider charges the experience provider for utilization of the second set of services, and the service provider shares revenue with the one or more third-parties.

14. A system as recited in claim 1, wherein the services engines are distributed across a plurality of servers.

15. A system as recited in claim 1, wherein each service engine has a corresponding experience agent including a corresponding API and a corresponding sentio codec.

16. A system comprising:
a plurality of devices, wherein each device includes a specific experience agent, each specific experience agent including a specific API exposing services available on each device and a specific sentio codec for encoding multiple types of data streams into an encoded experience data stream and for decoding to playback;
an experience server in communication with the plurality of devices, the experience server including:
  a first experience agent, the first experience agent including a first API and a first sentio codec; and
  an experience composition engine;
wherein the experience composition engine is operable to:
  receive layers via the specific sentio codec from the plurality of devices; and
  compose and direct the layers using the services and the first sentio codec into an encoded participant experience to be presented on a device.

17. A system as recited in claim 16, wherein the layers are mobile, such that the layers can be moved or shifted amongst the plurality of devices and each of the layers can be split or duplicated.

* * * * *

UNITED STATES PATENT AND TRADEMARK OFFICE
CERTIFICATE OF CORRECTION

| | |
|---|---|
| PATENT NO. | : 8,463,677 B2 |
| APPLICATION NO. | : 13/136869 |
| DATED | : June 11, 2013 |
| INVENTOR(S) | : Stanislav Vonog, Nikolay Surin and Tara Lemmey |

It is certified that error appears in the above-identified patent and that said Letters Patent is hereby corrected as shown below:

On the Title Page, Item (54) and in the Specification, Column 1, lines 1-2 please delete the "SYSTEM ARCHITECTURE FOR EXPERIENTIAL COMPUTING" and replace with the title that should appear as follows "SYSTEM ARCHITECTURE AND METHODS FOR EXPERIENTIAL COMPUTING"

Signed and Sealed this
Twentieth Day of August, 2013

Teresa Stanek Rea
*Acting Director of the United States Patent and Trademark Office*